US012712247B2

(12) United States Patent
Bilen et al.

(10) Patent No.: US 12,712,247 B2
(45) Date of Patent: Aug. 18, 2026

(54) DEPLOYABLE ELECTROMAGNETIC WAVEGUIDES

(71) Applicant: The Penn State Research Foundation, University Park, PA (US)

(72) Inventors: Sven Gunnar Bilen, State College, PA (US); Xin Ning, State College, PA (US); Nikhil Ashok, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 19/143,211

(22) PCT Filed: Jan. 11, 2024

(86) PCT No.: PCT/US2024/011201
§ 371 (c)(1),
(2) Date: Jun. 25, 2025

(87) PCT Pub. No.: WO2024/151832
PCT Pub. Date: Jul. 18, 2024

(65) Prior Publication Data

US 2026/0121273 A1 Apr. 30, 2026

Related U.S. Application Data

(60) Provisional application No. 63/438,618, filed on Jan. 12, 2023.

(51) Int. Cl.
*H01P 3/12* (2006.01)
*H01P 7/06* (2006.01)

(52) U.S. Cl.
CPC . *H01P 3/12* (2013.01); *H01P 7/06* (2013.01)

(58) Field of Classification Search
CPC ...... H01P 3/12; H01P 3/14; H01P 5/08; H01P 7/06
See application file for complete search history.

(56) References Cited

U.S. PATENT DOCUMENTS 2,464,598 A * 3/1949 Meier ...................... H01P 3/14 333/256
2,571,021 A * 10/1951 Early ...................... H01P 3/14 333/241

(Continued)

FOREIGN PATENT DOCUMENTS

EP 4033601 A1 * 7/2022 ......... H01Q 21/0037
WO 2020255660 A1 12/2021

(Continued)

OTHER PUBLICATIONS

International Search Report and Written Opinion for PCT/US2024/011201 filed Jan. 11, 2024 dated May 3, 2024.

*Primary Examiner* — Andrea Lindgren Baltzell
*Assistant Examiner* — Alan Wong
(74) *Attorney, Agent, or Firm* — Buchanan Ingersoll & Rooney PC

(57) ABSTRACT

Embodiments relate to a deployable and/or reconfigurable waveguide and waveguide-based components that can be configured to various states of length along a longitudinal axis such that the waveguide is an expandable structure. The waveguide can be expanded or unfolded to an expanded (or deployed) state, and the waveguide can be compressed or folded to a compressed state. The deployable waveguide comprises a hollow tube extending in a longitudinal direction. The hollow tube may be folded according to various different origami-inspired folding patterns.

20 Claims, 26 Drawing Sheets

(56) References Cited

U.S. PATENT DOCUMENTS

| | | | | |
|---|---|---|---|---|
| 2,600,169 | A * | 6/1952 | Lamb | H01P 5/082<br>138/139 |
| 2,853,687 | A | 9/1958 | Weber | |
| 6,181,220 | B1 | 1/2001 | Meder | |
| 6,233,880 | B1 * | 5/2001 | Sogame | B64G 99/00<br>52/79.5 |
| 10,079,418 | B2 * | 9/2018 | Nickel | H01P 3/16 |
| 11,108,161 | B2 * | 8/2021 | Rockberger | H01P 3/16 |
| 12,494,561 | B2 * | 12/2025 | Billod | H01P 3/14 |
| 2015/0029069 | A1 | 1/2015 | Roemer et al. | |
| 2020/0091612 | A1 | 3/2020 | Rockberger et al. | |
| 2021/0091612 | A1 | 3/2021 | Dameron et al. | |

FOREIGN PATENT DOCUMENTS

| | | | |
|---|---|---|---|
| WO | 2021255660 | A1 | 12/2021 |
| WO | 2022148835 | A1 | 7/2022 |

* cited by examiner

DEPLOYABLE ELECTROMAGNETIC WAVEGUIDES

CROSS-REFERENCE TO RELATED APPLICATIONS

This application is the U.S. National Stage Application of International Patent Application No. PCT/US2024/011201, filed on Jan. 11, 2024, which is related to and claims priority to U.S. Provisional Patent Application No. 63/438,618, which was filed on Jan. 12, 2023. The entirety of these applications are incorporated by reference herein.

FIELD OF THE INVENTION

Embodiments relate to a waveguide for use in transmitting electromagnetic waves, and particularly to an origami-inspired deployable and/or reconfigurable electromagnetic waveguide.

BACKGROUND OF THE INVENTION

Waveguides are structures that guide electromagnetic waves and can be used for carrying microwave signals, especially at higher power levels that cannot be carried in coaxial cables. Waveguides are employed in microwave communication systems, radars, and other high frequency applications due to their ability to transport microwave power with lower loss relative to coaxial cables. For example, in space applications, waveguide systems are extensively utilized in the communication payloads of satellites, among other uses. Waveguides commonly comprise a hollow metal tube wherein electromagnetic waves are guided by total internal reflection from the conducting walls of the tube and are characterized by a specific frequency range of operation to be above cutoff and in the fundamental (lowest order) mode. While waveguides are typically used in the fundamental mode, there are applications where they are operated at frequencies in which higher-order modes are excited and desirable.

SUMMARY OF THE INVENTION

Although flexible waveguides have seen widespread use, there is no evidence that the design of waveguides as a deployable structure has been explored. Accordingly, there is a clear unmet need for a waveguide designed as a deployable structure that enables an initial as-small-as-possible volume configuration that can deploy into required forms and dimensions as necessary.

Deployable structures have a wide range of applications owing to their inherent ability to achieve different configurations in line with various requirements. Deployable structures are typically lightweight, compact, and offer efficient deployment capabilities. In particular, they can be packaged into smaller volumes and deployed at a service location to a predetermined configuration. For example, regarding space applications, deployable structures are widely employed as the payload and cost constraints associated with space systems are stringent.

We have found that origami-inspired deployable design may be used to construct a deployable waveguide. Such designs have low-loss transmission capabilities and can be particularly useful in applications wherein payload constraints are stringent. The designs can be packaged as a folded structure due to their origami-inspired design and then deployed at the service location with negligible performance degradation.

Embodiments therefore relate to a deployable waveguide that can be configured to various states of length along a longitudinal axis such that the waveguide is an expandable structure. The waveguide can be expanded or unfolded to an expanded (or deployed) state, and the waveguide can be compressed or folded to a compressed state. The deployable waveguide comprises a hollow tube extending in a longitudinal direction. The hollow tube may be folded according to various different origami-inspired folding patterns, such as a shopping bag folding pattern and/or an accordion folding pattern, to allow for the deployable and configurable nature of the waveguide.

In an exemplary embodiment, a deployable waveguide comprises a hollow tube extending in a longitudinal direction, wherein the hollow tube is folded according to an origami-inspired folding pattern.

In some embodiments, the waveguide is reconfigurable to various states of length along the longitudinal direction. The length of the waveguide can be its largest dimension in some embodiments. The waveguide can also have a thickness and a height. The height can be perpendicular to the thickness. The length can be perpendicular to the height and also perpendicular to the thickness. In other configurations the waveguide can have a diameter (e.g. cylindrical shaped configurations, etc.). The hollow tube can have a polygonal shaped cross-section (e.g. rectangular shaped, hexagonal shaped, etc.), a circular cross-section, an oval cross-section, or other shaped cross-section.

In some embodiments, the waveguide is reconfigurable between a compressed state of length and an expanded state of length. In a compressed state, the length can be less than the length of the waveguide in its expanded state. There can also be other intermediate states between a fully compressed state and a fully expanded state (e.g. one or more partially expanded states). The waveguide can be adjusted into numerous partially expanded states as it is expanded from its fully compressed state to its fully expanded state (or vice versa in embodiments where the waveguide can be adjusted from its fully expanded state back to its fully compressed state).

In some embodiments, the hollow tube comprises an exterior surface and an interior surface, wherein the interior surface comprises a conductive material.

In some embodiments, the hollow tube comprises a first side wall, a second side wall, a top wall, and a bottom wall.

In some embodiments, the hollow tube is folded according to the folding pattern such that the first side wall has a plurality of first cross-sectional creases, the second side wall has a plurality of second cross-sectional creases opposite of the first cross-sectional creases of the first side wall, the top wall has a first longitudinal crease, and the bottom wall has a second longitudinal crease opposite of the first longitudinal crease of the top wall.

In some embodiments, the plurality of first cross-sectional creases includes first concave creases and first convex creases following an alternating pattern, and wherein the plurality of second cross-sectional creases includes second concave creases and second convex creases following an alternating pattern.

In some embodiments, each first concave crease is opposite of each second convex crease, and wherein each first convex crease is opposite of each second concave crease.

In some embodiments, the first longitudinal crease and second longitudinal creases are concave creases.

In some embodiments, the first longitudinal crease and second longitudinal creases are convex creases.

In some embodiments, the hollow tube is folded according to the folding pattern such that the first side wall has a plurality of first cross-sectional creases, the second side wall has a plurality of second cross-sectional creases opposite of the first cross-sectional creases of the first wall, the top wall has a plurality of third cross-sectional creases, and the bottom wall has a plurality of fourth cross-sectional creases opposite of the third cross-sectional creases of the top wall.

In some embodiments, the plurality of first cross-sectional creases includes first concave creases and first convex creases following an alternating pattern, and wherein the plurality of second cross-sectional creases includes second concave creases and second convex creases following an alternating pattern.

In some embodiments, each first concave crease is opposite of each second concave crease, and wherein each first convex crease is opposite of each second convex crease.

In some embodiments, the plurality of third cross-sectional creases includes third concave creases and third convex creases following an alternating pattern, and wherein the plurality of fourth cross-sectional creases includes fourth concave creases and fourth convex creases following an alternating pattern.

In some embodiments, each third concave crease is opposite of each fourth concave crease, and wherein each third convex crease is opposite of each fourth convex crease.

In some embodiments, a cross-sectional profile at a first end of the waveguide is smaller than a cross-section profile at a second end of the waveguide such that the waveguide expands in a transverse direction when in the expanded state of length.

In some embodiments, the waveguide is a straight waveguide.

In some embodiments, the waveguide is a twisted waveguide.

In some embodiments, the waveguide is an E-Bend waveguide.

In some embodiments, the waveguide is an H-Bend waveguide.

In some embodiments, the waveguide is a magic tee waveguide.

In some embodiments, the waveguide is a slotted waveguide antenna comprising at least one slot.

In some embodiments, the at least one slot includes numerous slots or a single slot that can be positioned in a predetermined arrangement such that the waveguide achieves a desired radiation pattern when the waveguide is in an expanded state of length.

In some embodiments, the waveguide is a directional coupler.

In some embodiments, the waveguide is a waveguide transition.

In some embodiments, the waveguide is a filter selected from the group consisting of a band-pass filter, a band-stop filter, a high-pass filter, and a low-pass filter.

In some embodiments, the waveguide is a splitter configured to split microwave power.

In some embodiments, the waveguide is a combiner configured to combine microwave power.

In some embodiments, the waveguide is an attenuator configured to reduce microwave power.

In some embodiments, the waveguide is a resonant cavity.

In an exemplary embodiment, a deployable waveguide assembly comprises a deployable waveguide comprising a hollow tube, a first flange connected to a first end of the hollow tube, and a second flange connected to a second end of the hollow tube.

Other details, objects, and advantages of the deployable waveguide and methods of making and using the same will become apparent as the following description of certain exemplary embodiments thereof proceeds.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

FIG. 5 shows an exemplary unit according to a second folding pattern.

DETAILED DESCRIPTION OF THE INVENTION

The following description is of exemplary embodiments and methods of use that are presently contemplated for carrying out the present invention. This description is not to be taken in a limiting sense, but is made merely for the purpose of describing the general principles and features of various aspects of the present invention. The scope of the present invention is not limited by this description.

A waveguide is a structure that guides waves, such as electromagnetic waves, with minimal loss of energy by restricting the transmission of energy to one direction. The deployable waveguide described herein can be employed in a variety of industries and applications wherein electromagnetic waves are transmitted and wherein a deployable structure may be advantageous. For example, the design of the deployable waveguide described herein can provide a lightweight, compact, and configurable alternative for any industry or application compared to existing waveguides.

Figure 1:
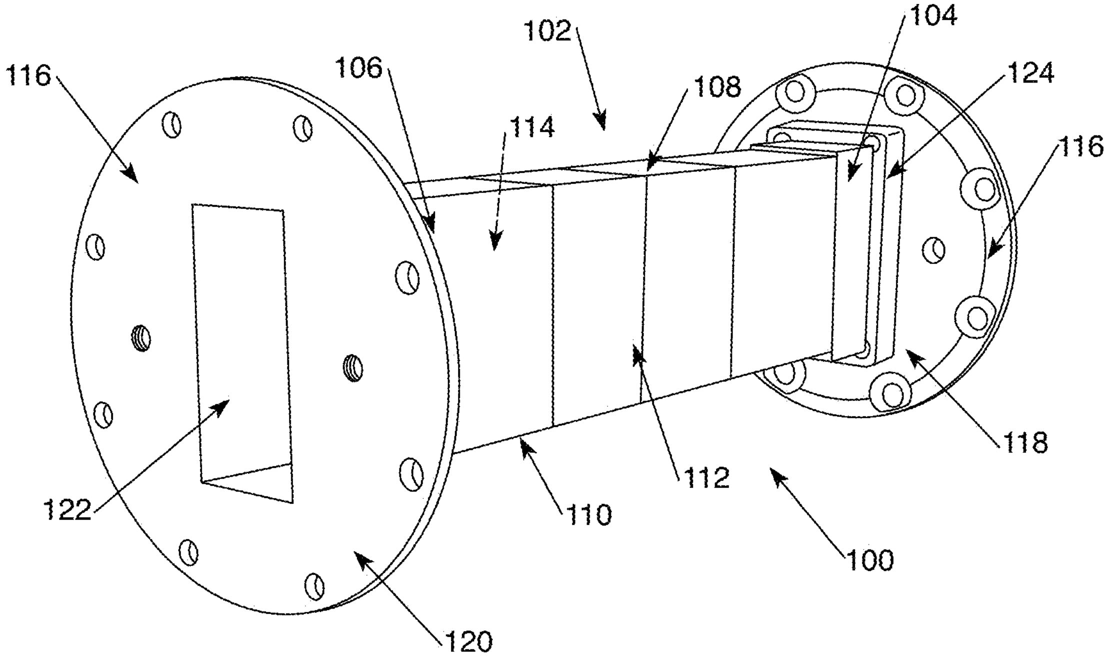
FIG. 1 shows an exemplary embodiment of a deployable waveguide according to a first folding pattern.
Figure 2:
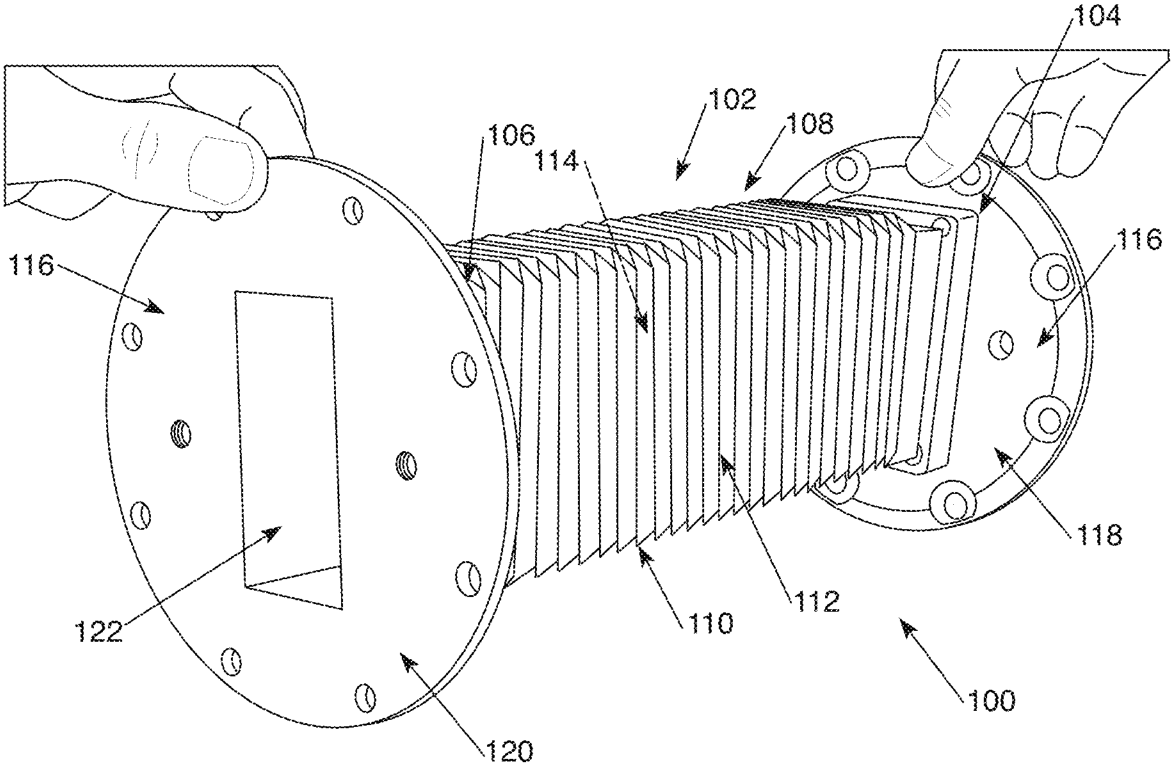
FIG. 2 shows an exemplary embodiment of a deployable waveguide according to a second folding pattern.

As seen in FIGS. 1 and 2, embodiments relate to a deployable waveguide 100. The deployable waveguide 100 can be configured to various states of length along a longitudinal axis such that the waveguide 100 is an expandable structure. The deployable waveguide 100 can therefore be compressed or folded for good stability and expanded or unfolded to an operational size while maintaining effective operating properties. For example, the deployable waveguide 100 can be expanded or unfolded to an expanded (or deployed) state, and the deployable waveguide 100 can be compressed or folded to a compressed state. In an expanded state the waveguide 100 is at or near its maximum length, and in a compressed state the waveguide 100 is at its minimum length. The waveguide 100 thus has a greater length along the longitudinal axis when in its expanded state than when in its compressed state.

In some embodiments, the waveguide 100 may further be in a partially expanded state, in which the waveguide 100 is at a length between its maximum length and minimum length. Accordingly, the length of the waveguide 100 in the partially expanded state of length can vary widely and the waveguide 100 can be configurable by adjusting the amount of expansion of the waveguide 100 between a compressed state and an expanded state.

The deployable waveguide 100 comprises a hollow tube 102 extending in the direction of the longitudinal axis. The hollow tube 102 may be folded according to various different origami-inspired folding patterns, examples of which are described below in detail, to allow for the deployable and configurable nature of the waveguide 100. The term “fold” relates to a line or ridge on the hollow tube 102 and may be formed from, without limitation, creasing, pressing, and/or crushing. It is contemplated that the folding patterns further allow for controlled and orderly expansion and collapse of the waveguide 100. It is further contemplated that the hollow tube 102 may be 3D printed and/or additively manufactured to adequately form various different origami-inspired folding patterns.

The hollow tube 102 comprises an exterior surface and an interior surface. The exterior surface of the hollow tube 102 comprises a malleable material such that exterior surface may be folded according to various folding-patterns. The material may be selected from the group consisting of, but not limited to, polyimide, polymers, aluminum, brass, copper, combinations thereof, or any other suitable material. The interior surface of the hollow tube 102 may comprise a conductive material such that inner walls of hollow tube 102 are configured to guide waves via total internal reflection from the inner walls. It is contemplated that the hollow tube 102 may be a uniform material (e.g., a metal) such that the exterior and interior surfaces are made of the same material, or may comprise more than one material (e.g., a nonconductive material with the interior surface comprising a conductive material).

The hollow tube 102 can have a first end 104 and a second end 106 defining the length of the hollow tube 102. The hollow tube 102 can have any cross-sectional profile, including but not limited to, a square, rectangle, parallelogram, circular shape, hexagon, octagon, etc. In exemplary embodiments, the waveguide 100 may be a double ridged waveguide such that the hollow tube 102 includes an H-shaped cross-section, or the waveguide 100 may be a single ridges waveguide such that the hollow tube 102 includes a U-shaped cross section.

In some embodiments, the cross-sectional profile at a first end 104 may be smaller in size that the cross-sectional profile at the second end 106 such that the deployed waveguide 100 may also expand in a transverse direction (e.g., in a direction opposite of the longitudinal direction). For example, as a waveguide 100 is expanded to an expanded or partially expanded state, the waveguide 100 may become wider in the transverse direction along its length. It is therefore contemplated that a waveguide 100 may be deployable in more than one direction.

In an exemplary embodiment, it is contemplated that the hollow tube 102 has at least a top wall 108, a bottom wall 110 opposite of the top wall 108, a first side wall 112, and a second side wall 114 opposite of the first side wall 112, though it is contemplated that the hollow tube 102 may have a different cross-sectional profile without such features.

In some embodiments, a deployable waveguide assembly can be formed by assembling a plurality of waveguides 100. The assembly may comprise at least one flange 116. The flange 116 may be made from a rigid material (e.g., metal, plastic, or any other suitable material). The flange 116 has a first face 118 configured to couple to an end 104, 106 of the hollow tube 102, and a second face 120 configured to connect to another flange or some other structure. The connection between two flanges, or between a flange and some other structure, may be made with bolts or through alternative connection mechanisms (e.g., threaded collar, dowel pins, etc.). The flange 116 is therefore configured to at least strengthen the assembly/waveguide, serve as a connector for joining different sections of a waveguide assembly, serve as a connector for joining a waveguide to some other structure, and/or maintain continuity between different waveguide sections of the larger assembly. In an alternative embodiment, different sections of a waveguide assembly may be joined together or to some other structure via alternative means (e.g., without a flange 116), such as by soldering, brazing, or any other suitable means.

The flange 116 also has an aperture 122 extending from the first face 118 and through the second face 120. The dimensions of the aperture 122 match the dimensions of the end 104, 106 of the hollow tube 102 such that the flange 116 may receive and couple to the end 104, 106 (e.g., via socket-mounting). In some embodiments, the first face 118 may have a protruding element 124 including the aperture 122 wherein the protruding element 124 is configured to receive and couple to the end 104, 106 of the hollow tube 102.

First Folding Pattern

Figure 3A:
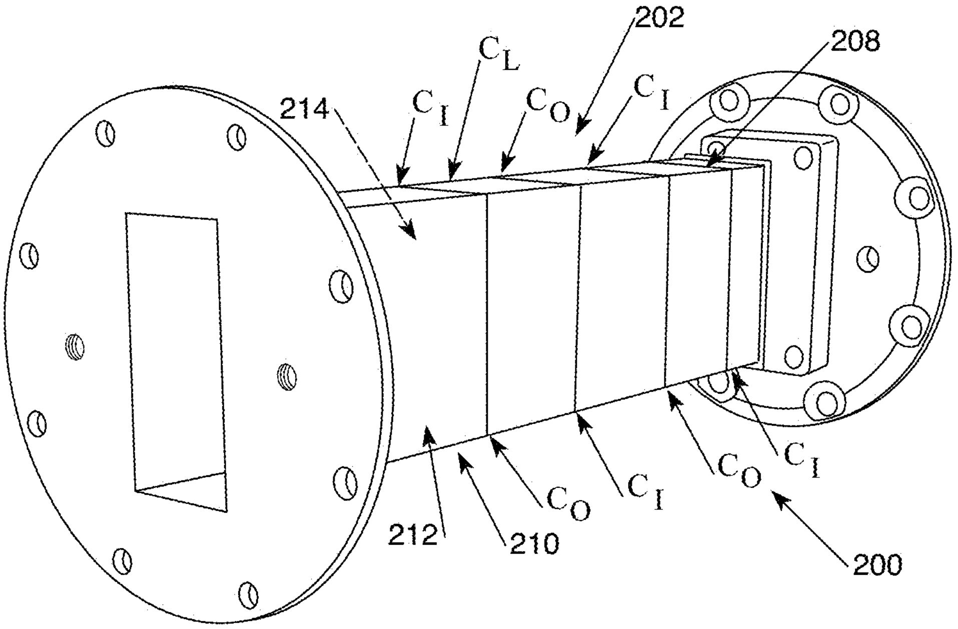
FIG. 3A shows an exemplary embodiment of a deployable waveguide according to a first folding pattern in expanded state.
Figure 3B:
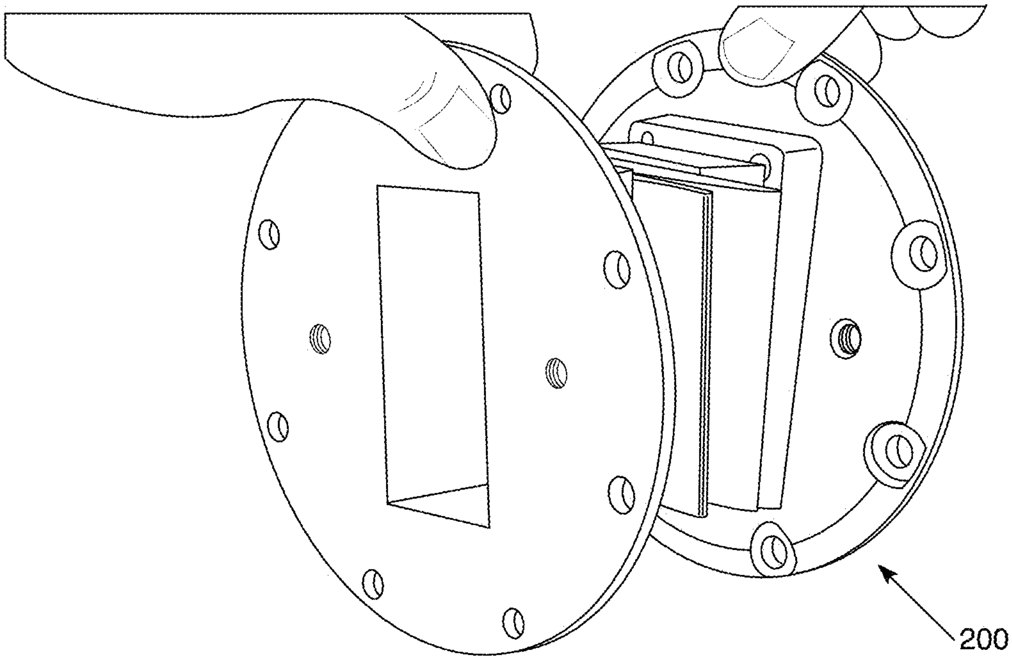
FIG. 3B shows an exemplary embodiment of the deployable waveguide of FIG. 3A according to a first folding pattern a compressed state.

In a first exemplary embodiment, a hollow tube 202 is folded according to a first folding pattern. The first folding pattern can allow for a deployable waveguide 200 to be expanded or unfolded to an expanded (or deployed) state (see FIG. 3A) and to be compressed or folded to a compressed state (see FIG. 3B). The first folding pattern may alternatively be referred to herein as a shopping-bag folding pattern given its likeness to a folding pattern of a traditional shopping bag.

The first folding pattern includes a plurality of opposite cross-sectional concave $C_I$ and convex $C_O$ creases in the first and second side walls 212, 214 of the hollow tube 202. In other words, a concave crease $C_I$ in a side wall is paired with an opposite convex crease $C_O$ in the other side wall, and vice versa. The term "cross-sectional crease" refers to a crease in a transverse direction in relation to the longitudinal axis. The term "concave crease" refers to a crease configured to allow a wall of the hollow tube to fold inward and toward the opposite wall of the hollow tube. The term "convex crease" relates to a crease configured to allow a wall of the hollow tube to fold outward and away from the opposite wall of the hollow tube. Accordingly, by positioning a concave crease $C_I$ opposite of a convex crease $C_O$, the concave crease $C_I$ can be folded towards the convex crease $C_O$ and the convex crease $C_O$ can be folded away from the concave crease $C_I$ when configuring the deployable waveguide 200 from its expanded state (see FIG. 3A) to its compressed state (see FIG. 3B). All cross-sectional concave $C_I$ and convex $C_O$ creases preferably have a uniform length.

It is contemplated that the cross-sectional creases may be spaced apart and equidistant from one another along the first and second side walls 212, 214. It is further contemplated that along each side wall in the longitudinal direction, a concave crease $C_I$ is followed by a convex $C_O$ crease and a convex crease $C_O$ is followed by a concave crease $C_I$.

It is contemplated that the first folding pattern may include any number of pairs of opposite cross-sectional concave $C_I$ and convex creases $C_O$. For example, there may be one pair of opposite creases, two pairs of opposite creases, three pairs of opposite creases, four pairs of opposite creases, five pairs of opposite creases, etc. It is contemplated that there may be no limit on the number of pairs of opposite cross-sectional creases. The number of pairs of opposite cross-sectional concave $C_I$ and convex $C_O$ creases may be influenced by the length of the waveguide 200 in its expanded state (see FIG. 3A).

The first folding pattern further includes opposite longitudinal creases $C_L$ on the top and bottom walls 208, 210 of the hollow tube 202. The term "longitudinal crease" refers to a crease extending along the longitudinal axis. The longitudinal creases $C_L$ preferably have a uniform length and may not extend the entire length of the top and bottom walls 208, 210 of the hollow tube 202. The longitudinal creases $C_L$ can either both be concave, both be convex, or be a combination of concave/convex.

It is contemplated that the opposite longitudinal creases $C_L$ help facilitate folding of the opposite cross-sectional concave $C_I$ and convex creases $C_O$ when folding the deployable waveguide 200 from its expanded state to its compressed state (or unfolding the deployable waveguide from its compressed state to its expanded state).

It is contemplated any concave crease may not result in a straight/flat wall and may result in an inwardly projecting wall. It is similarly contemplated that any convex crease may not result in a completely straight/flat wall and may result in an outwardly projecting wall.

It is contemplated that the first folding pattern can allow a hollow tube to be configured in a number of different configurations in an expanded state, preferably as a straight rectangular waveguide.

Second Folding Pattern

Figure 4A:
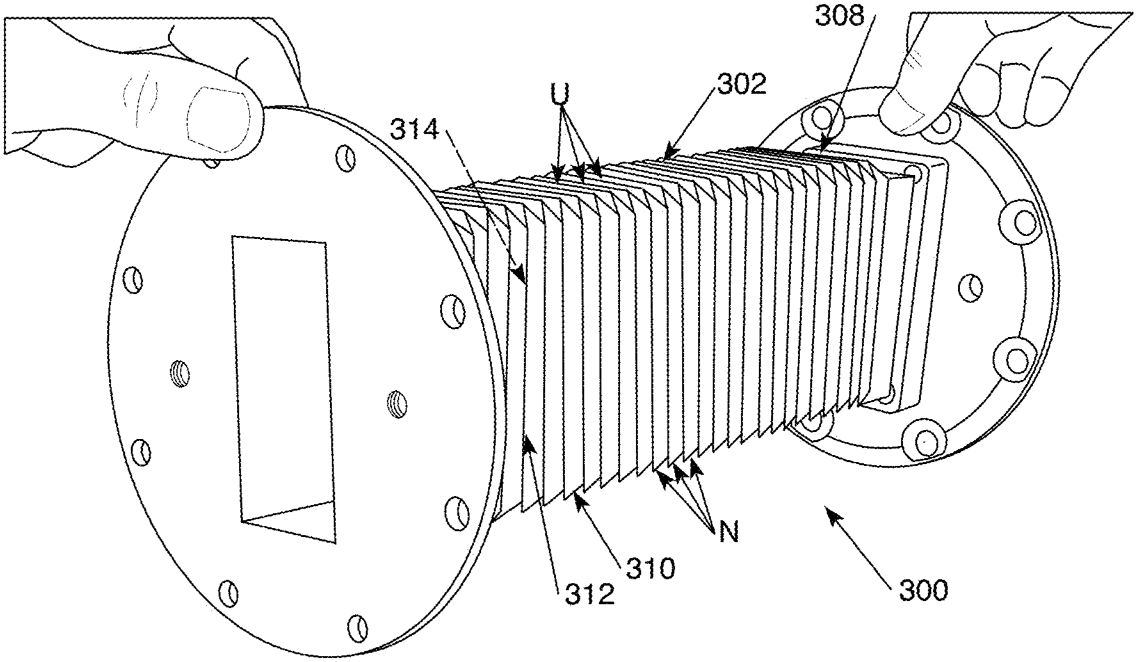
FIG. 4A shows an exemplary embodiment of a deployable waveguide according to a second folding pattern in an expanded state.
Figure 4B:
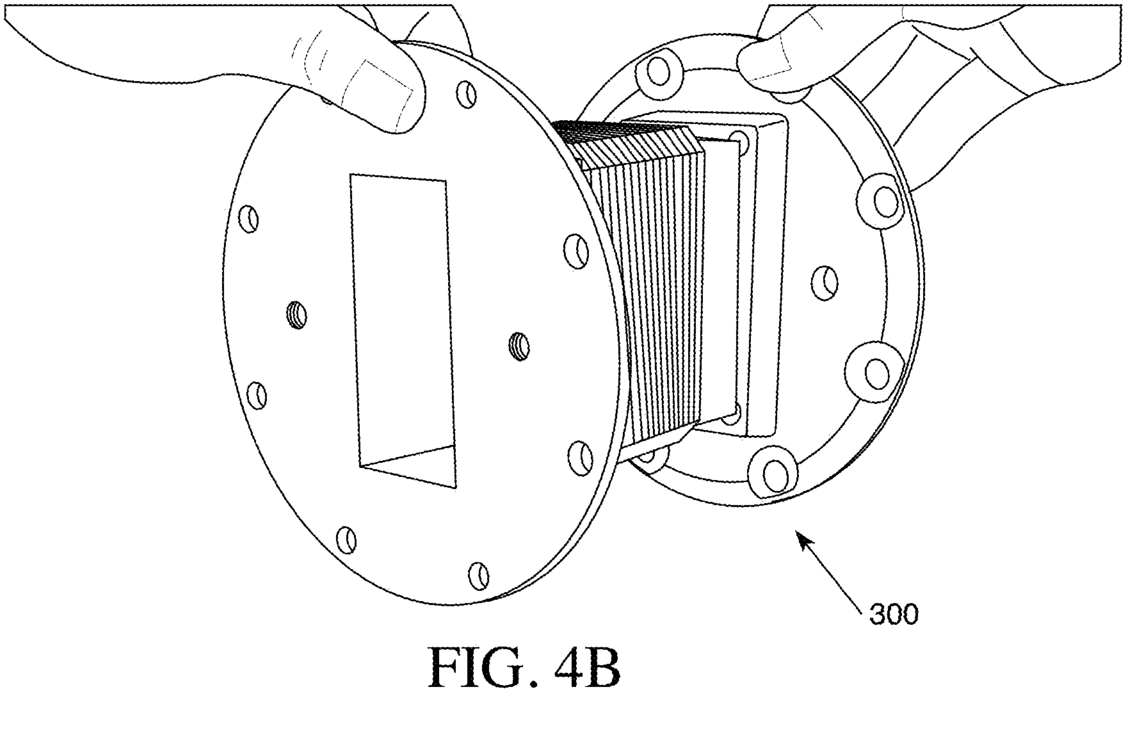
FIG. 4B shows an exemplary embodiment of a deployable waveguide according to a second folding pattern in a compressed state.

In a second exemplary embodiment, a hollow tube 302 is folded according to a second folding pattern. The second folding pattern can allow for the deployable waveguide 300 to be expanded or unfolded to an expanded (or deployed) state (see FIG. 4A) and to be compressed or folded to a compressed state (see FIG. 4B). The second folding pattern can further allow for the deployable waveguide 300 to be expended or unfolded to a partially expanded state (not shown). The second folding pattern may alternatively be referred to herein as an accordion folding pattern given its likeness to the bellows/units of an accordion.

The second folding pattern includes a plurality of repetitive units N in the first and second side walls 312, 314 of the hollow tube 302. FIG. 5 shows an exemplary unit N. The repetitive units N are formed by an alternating pattern of a cross-section concave $C_I$ and convex $C_O$ creases, such that a pattern of repeating ridges and grooves are formed on the first and second side walls 312, 314 of the hollow tube 302.

It is contemplated that each concave crease $C_I$ of the first side wall 312 may be opposite of a concave crease $C_I$ of the second side wall 312, such that the creases may be aligned along a cross-section of the hollow tube 302. It is similarly contemplated that each convex crease $C_O$ of the first side wall 312 may be opposite of a convex crease $C_O$ of the second side wall 314, such that the creases may be aligned along a cross-section of the hollow tube 302.

It is contemplated that the second folding pattern may include any number of units Non the first and second side walls 312, 314, such as at least one unit N. It is contemplated that there may be no limit on the number of units N. The number of units N may be influenced by the length of the waveguide 300 in its expanded state (see FIG. 4A).

As seen in FIG. 5, the width of the triangular ridge of a repetitive unit N is defined by width W. The minimum width achievable may be influenced by the material of the waveguide.

The second folding pattern further includes a plurality of repetitive units (in the top and bottom walls 308, 310 of the hollow tube 302. The repetitive units U are formed by an alternating pattern of a cross-section concave $C_I$ and convex $C_O$ creases, such that a pattern of repeating ridges and grooves are formed on the top and bottom walls 308, 310 of the hollow tube 302.

It is contemplated that each concave crease $C_I$ of the top wall 308 may be opposite of a concave crease $C_I$ of the bottom wall 310, such that the creases may be aligned along a cross-section of the hollow tube 302. It is similarly contemplated that each convex crease $C_O$ of the top wall 308 may be opposite of a convex crease $C_O$ of the bottom wall 310, such that the creases may be aligned along a cross-section of the hollow tube 302.

It is contemplated that the second folding pattern may include any number of units U on the top and bottom walls 308, 310. The number of units U may be influenced by the length of the waveguide 300 in its expanded state (see FIG. 4A).

It is contemplated that the second folding pattern can allow the hollow tube to be configured in any number of different configurations in an expanded state, including but not limited to a straight rectangular waveguide, a twisted deployable waveguide (see FIG. 6), an E-bend deployable waveguide (see FIG. 7), an H-bend deployable waveguide (see FIG. 8), and/or any other number of configurations that may be deployed/modified.

The waveguide 100 may be deployable to any waveguide structure and/or implementation regardless of the folding pattern used. It is understood that the term "waveguide" generally encompasses any waveguide component or combination of waveguides and/or waveguide components. In operation, the waveguide 100 may be utilized in any number of applications or uses.

In an exemplary application, the waveguide 100 may be a magic tee (also referred to as a hybrid tee) including a first arm, a second arm, a third arm, and a fourth arm, wherein each arm may be expanded or unfolded to an expanded state and/or be compressed or folded to a compressed state. The first and second arms may be co-linear and opposite arms, wherein the third arm forms an H-plane tee (and is parallel) with the first and second arms and the fourth arm forms an E-plane tee (and is perpendicular) with the first and second arms.

Figure 25A:
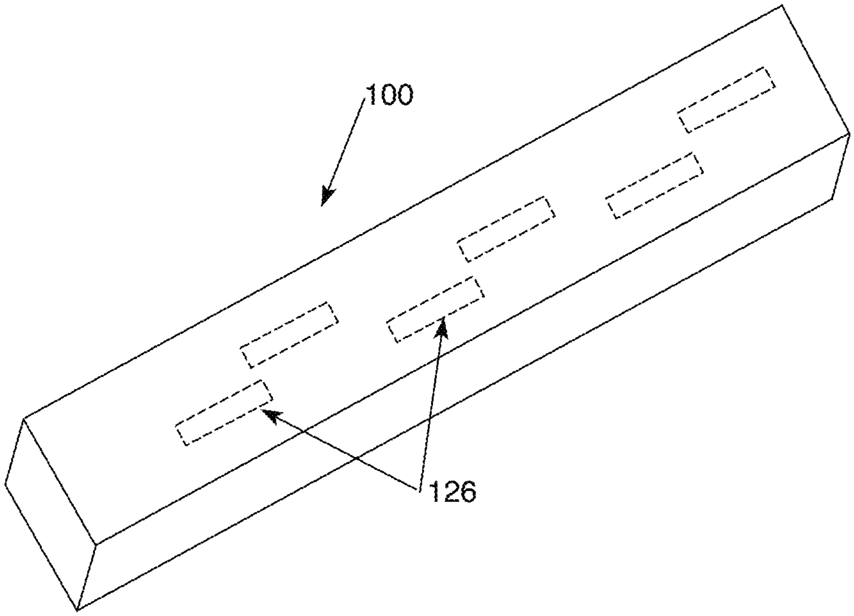
FIG. 25A is a perspective view of an exemplary embodiment of a deployable waveguide having slots.
Figure 25B:
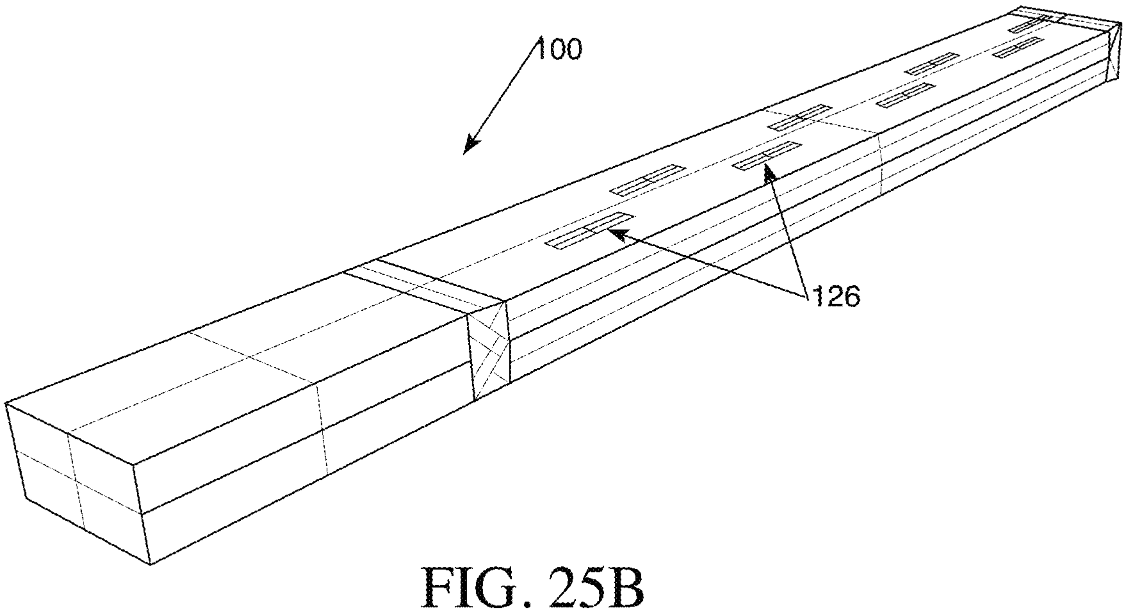
FIG. 25B is a perspective view of an exemplary embodiment of a deployable waveguide having slots.

In another exemplary application, as seen in FIGS. 25A and 25B, the waveguide 100 may be a slotted waveguide antenna including at least one slot 126 (broken lines in the figures) on at least one wall of the waveguide 100. The slots 126 may be elongated apertures that extend in the longitudinal and/or transverse and/or both directions (i.e., "diagonally") in relation to the longitudinal axis of the waveguide 100. The slots 126 may be positioned in a predetermined arrangement such that when the waveguide 100 is in an expanded and/or partially expanded state, the radiation pattern of the waveguide antenna may change in a manner to be desirable (e.g., less or greater directivity, generation of single or multiple radiation lobes, beam steering, null placement).

In other exemplary embodiments, the waveguide 100 may be a directional coupler; a waveguide transition configured to change the size of the waveguide from one size and/or shape to another size and/or shape; a filter to allow the propagation of waves from a first frequency to a second frequency (i. e., a band-pass filter), to exclude a range of frequencies (i.e., a band-stop filter), to allow up to a frequency (i.e., low-pass filter), and to allow above a frequency (i.e., high-pass filter), or any combination of these filters; a waveguide splitter/combiner configured to split or combine microwave power, and combinations thereof; an attenuator to reduce the microwave power; a short; a resonant cavity; etc. The above embodiments are for exemplary purposes only and do not limit the scope of the present disclosure.

EXAMPLES

The following examples are used for exemplary purposes only and by no means limit the scope of the present disclosure in any manner.

The provided examples analyze the electromagnetic performance of different deployable waveguide designs in comparison with a standard rectangular waveguide (e.g., a WR-284 waveguide). The WR-284 waveguide is a straight rectangular metal tube with round flanges (standard UG-584/U Round Cover) on both ends. The waveguide material is aluminum (though it may be any conductive material) and the total length of the tube (i.e., flange face to flange face) is 12.00 in (304.8 mm). For evaluation for embodiments of our waveguide, we redesigned the rectangular tube as a deployable structure to form an embodiment of our deployable waveguide to evaluate that embodiment as compared to this standard waveguide by using different deployable materials for forming the deployable waveguide embodiments.

Finite Element Analysis (FEA) was employed to analyze electromagnetic performance. All simulations were run using the RF Module of the commercial software package COMSOL Multiphysics. A general numerical framework was developed to carry out analysis involving model creation, simulation set up, and result extraction. However, it is contemplated that any electromagnetic simulation software may be used.

MATLAB and Python scripting were utilized to efficiently carry out the accordion folding pattern parametric study. A MATLAB script was developed that allows users to input the bellows design parameters, i.e., ridge width and the number of bellows units. Based on these data, the MATLAB script outputs text files containing the coordinates of the accordion model. Using this coordinate information, the CAD 3D model was generated in the software Rhino 3D using Python scripting. The shopping bag folding pattern and the standard rectangular waveguide CAD models were directly modeled in Rhino as a parametric study was not required for these models. The model was exported as a STEP (Standard for the Exchange of Product Data) file, which was then imported to COMSOL Multiphysics to perform the FEA. The material assigned at the boundaries of the waveguide was aluminum. The signal input and output ports were assigned, and the impedance boundary condition was assigned at all boundaries excluding the port areas. A physics-controlled mesh was adopted to carry out the meshing. The frequency range for the study was 2.60 to 3.95 GHz. Simulation results were post-processed using another MATLAB script. It is contemplated that while this was the method used for the present examples, the study could have been completed in any number of ways.

S-parameters (scattering parameters) were used to quantify the performance of the waveguide. S-parameters define how a single- or multi-port network reacts to signals that arrive at any or all of the ports upon injection from a given port. The responding port is indicated by the first number in the subscript, whereas the incident port is indicated by the second number. As a result, $S_{21}$ denotes the response at Port 2 due to a signal at Port 1. The rectangular waveguide is a 2-port network with Port 1 being the inlet port and Port 2 the outlet port. The value of $|S_{21}|$ should be close to 0 dB at all frequencies as higher values indicate greater transmission loss. Here, simulations are run to obtain the $S_{21}$ vs. frequency plot for a frequency range of 2.60 to 3.95 GHz for the standard rectangular waveguide and the deployable waveguide designs. The range for $S_{21}$ data is set between −10 to 10 dB as it is a conventional approach to evaluating the transmission efficiency of standard waveguides. The difference between the mean value of $|S_{21}|$ for the deployable waveguide and the baseline rigid rectangular waveguide is used to determine the increased average transmission loss.

Example 1: Shopping-Bag Folding Pattern Waveguide-Simulation Results

Figure 9:
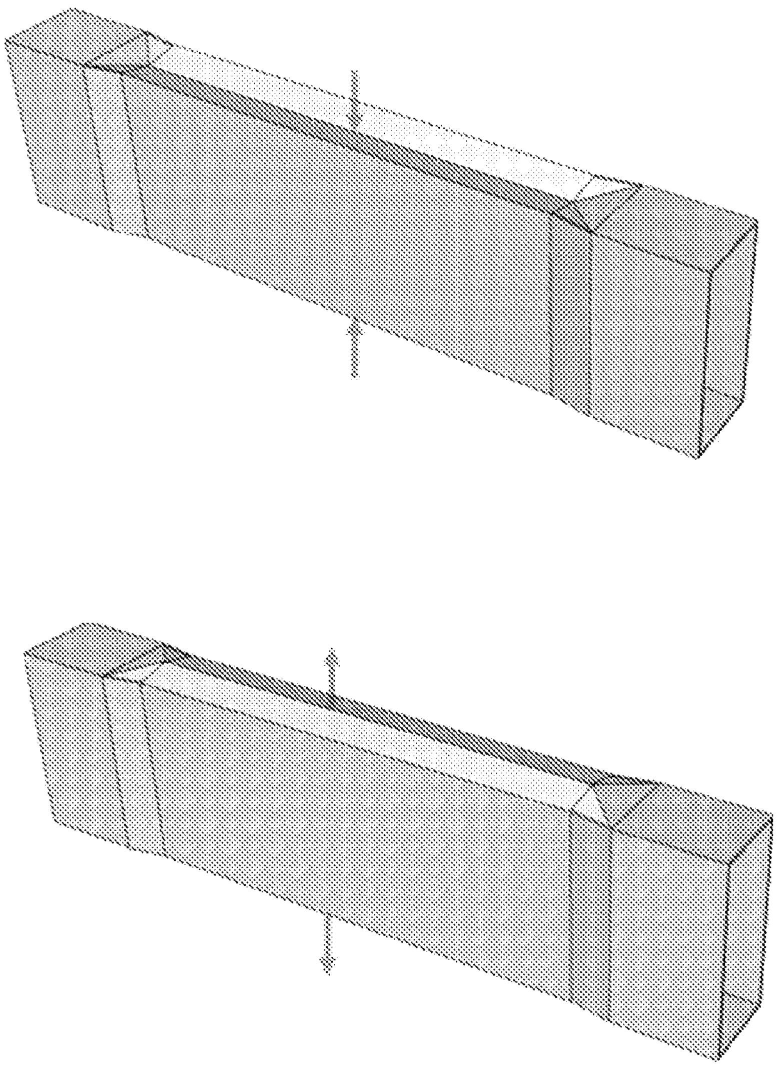
FIG. 9 shows exemplary longitudinal creases according to a first folding pattern.
Figure 10:
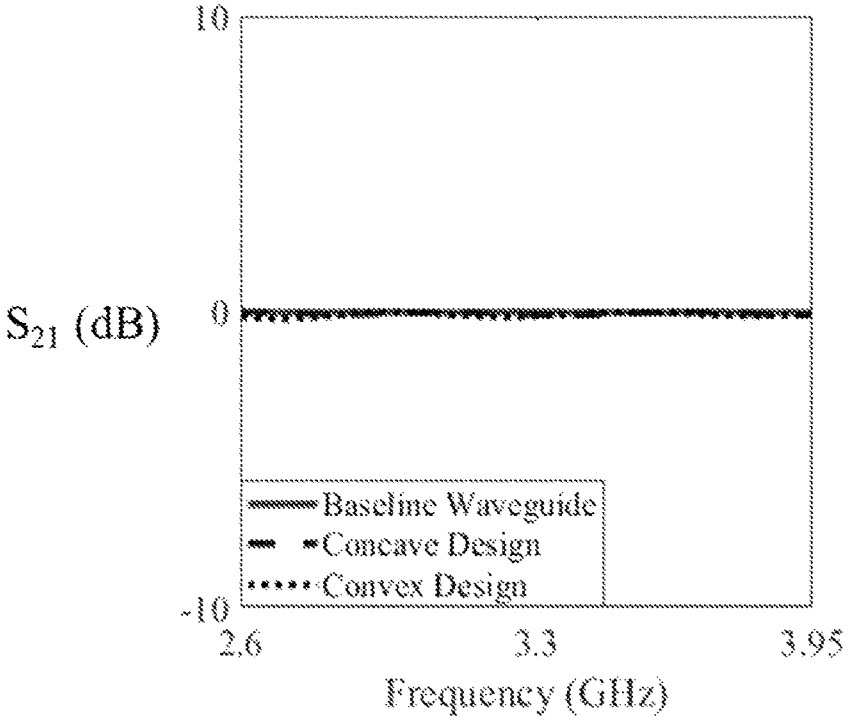
FIG. 10 is a graph showing a $S_{21}$ vs. frequency plot comparing baseline, concave, and convex shopping-bag waveguide designs.

The transmission performance of the convex and concave (on the top and bottom walls) shopping-bag folding pattern designs is compared to the standard rectangular waveguide using COMSOL Multiphysics. To create the concave and convex models, the middle triangular part of the shopping-bag CAD model shown in FIG. 9 is tilted by 10° with respect to the x-y plane outward and inward, respectively. The flanges are attached to the rectangular projections at the ends of the shopping-bag model shown in FIG. 9. The depth of these projections was set to 41.5 mm for both concave and convex designs. FIG. 10 shows the transmission response $S_{21}$ obtained for a frequency range of 2.60 to 3.95 GHz in steps of 0.01 GHz for the baseline, concave, and convex models. The plot indicates that the transmission performance of the concave and convex shopping bag designs is close to that of the baseline rectangular waveguide. Table 1 shows the difference in the mean transmission loss between baseline rectangular model and the two shopping-bag configurations. The loss for the convex design is found to be higher. However, this is relatively insignificant as the difference in mean loss for both designs is less than 0.1 dB. Hence, the simulation results indicate that both configurations offer excellent transmission capabilities.

TABLE 1

Difference in mean transmission loss between shopping bag configurations and baseline model.

| Configuration | $\text{Mean}(\lvert S_{21}\rvert_{config.}) - \text{Mean}(\lvert S_{21}\rvert_{baseline})$ (dB) |
|---|---|
| Concave Design | 0.044 |
| Convex Design | 0.094 |

Figure 11:
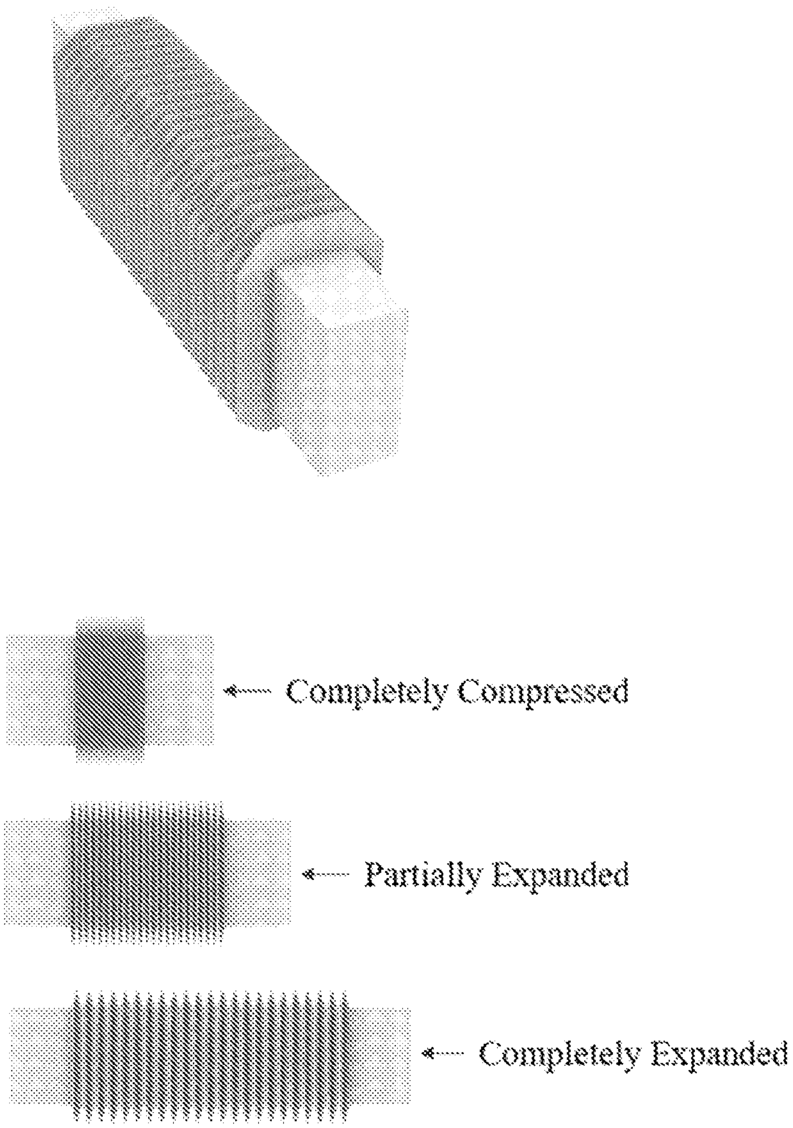
FIG. 11 shows a perspective view of the bellows waveguide CAD model and front views of the bellows waveguide CAD model for three deployment states for an exemplary embodiment of a bellows waveguide.
Figure 12:
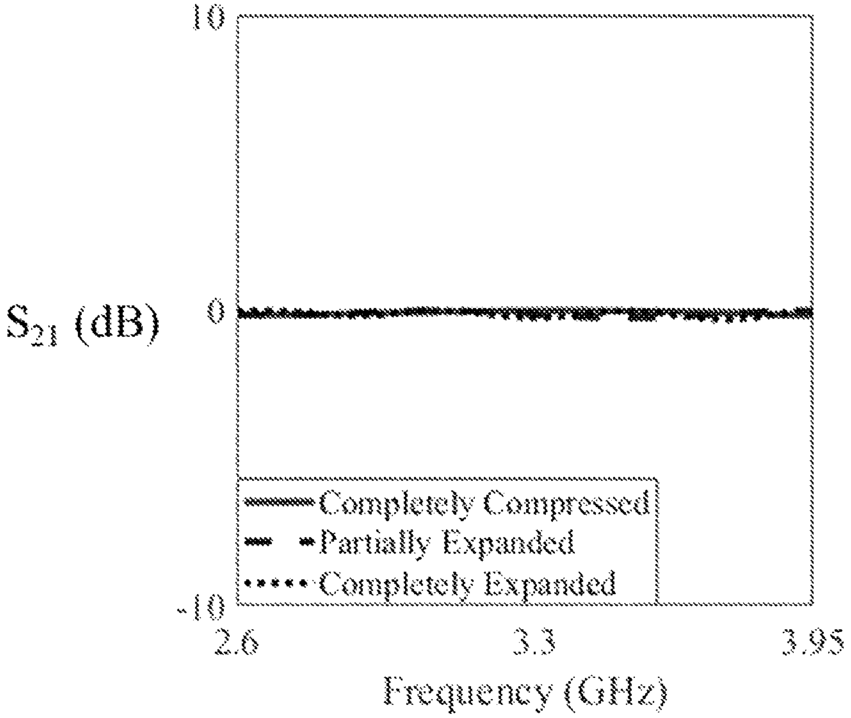
FIG. 12 is a graph showing a $S_{21}$ vs. frequency plot for the bellows waveguide for three states.

Example 2: Accordion Folding Pattern Waveguide-Simulation Results for Performance at Different Deployment Lengths FIG. 11 shows the perspective view of the CAD model of the bellows waveguide for design variables N=23 and w=15 mm. The rectangular projections at the ends represent the depth of the flanges to which the origami bellows is attached. This depth was set to 46 mm for all origami bellows models. Analysis was done to understand the transmission behavior of the bellows at three different deployment lengths: completely compressed, partially expanded, and completely expanded. Using the paper prototype bellows model for these design variables, the completely compressed length was found to be 45 mm. This information is used to design the three states of the bellows model as shown in FIG. 11. The transmission response $S_{21}$ for these three states is shown in FIG. 12. The data in the plots show that the transmission loss is low throughout the deployment process. This is an added advantage for the bellows design relative to the shopping bag design. The shopping bag design is completely closed during the compressed state and offers no transmission capabilities in that state. It was also noted that the least mean transmission loss was associated with completely compressed state. This is consistent with the expected behavior as the loss would increase with the transmission distance. The transmission performance for the expanded states listed in Table 2 is the increase in mean transmission loss relative to the completely compressed state.

TABLE 2

Increase in mean transmission loss of expanded states relative to fully compressed state.

| Deployment State | $\text{Mean}(\lvert S_{21}\rvert_{state}) - \text{Mean}(\lvert S_{21}\rvert_{compressed})$ (dB) |
|---|---|
| Partially Expanded | 0.043 |
| Completely Expanded | 0.048 |

Figure 13:
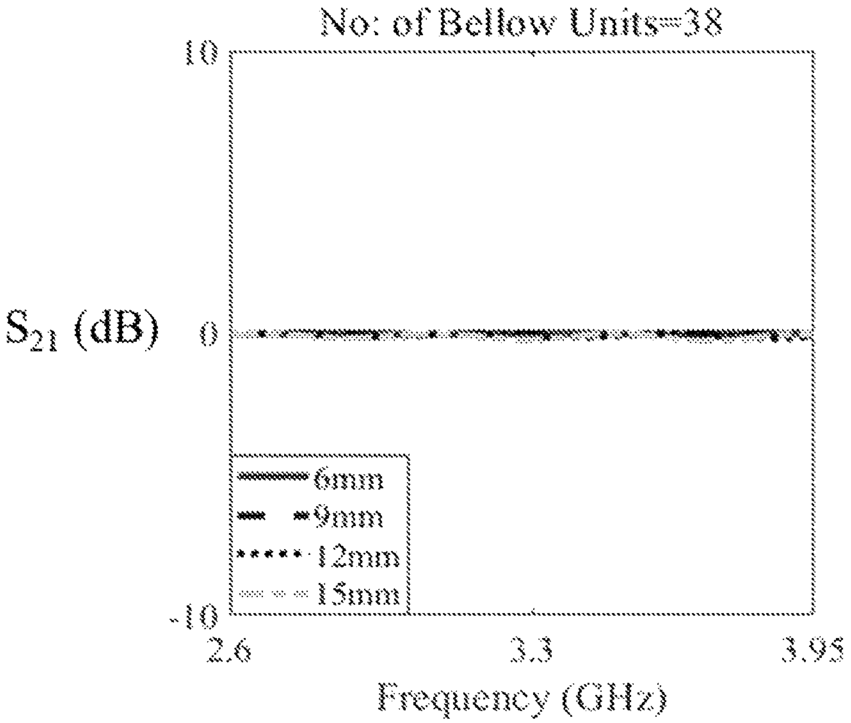
FIG. 13 is a graph showing a $S_{21}$ vs. frequency plot for bellows waveguide for different ridge widths and a constant number of bellows units.

Example 3: Accordion Folding Pattern Waveguide-Simulation Results for Varying Ridge Width while Keeping Number of Bellows Units Constant The number of bellows units is set to 38 and the ridge width is varied. The transmission performance is then evaluated to understand the influence of ridge width. FIG. 13 shows the transmission response $S_{21}$ for different ridge widths. It was observed that the model with lowest ridge width (6 mm) had the lowest transmission loss. It was noted that the transmission loss increases with the ridge width. This is in agreement with the expected behavior as the design approaches closer to the rectangular waveguide design with the reduction in ridge width. The transmission performance for bellows models with different ridge widths listed in Table 3 is the increase in mean transmission loss relative to lowest ridge width model.

TABLE 3

Increase in mean transmission loss of bellows models of increasing ridge width relative to lowest ridge width bellows model (6 mm)

| Ridge Width (mm) | $\text{Mean}(\lvert S_{21}\rvert_{config.}) - \text{Mean}(\lvert S_{21}\rvert_{w=6\ mm})$ (dB) |
|---|---|
| 9 | 0.017 |
| 12 | 0.058 |
| 15 | 0.1 |

Figure 14:
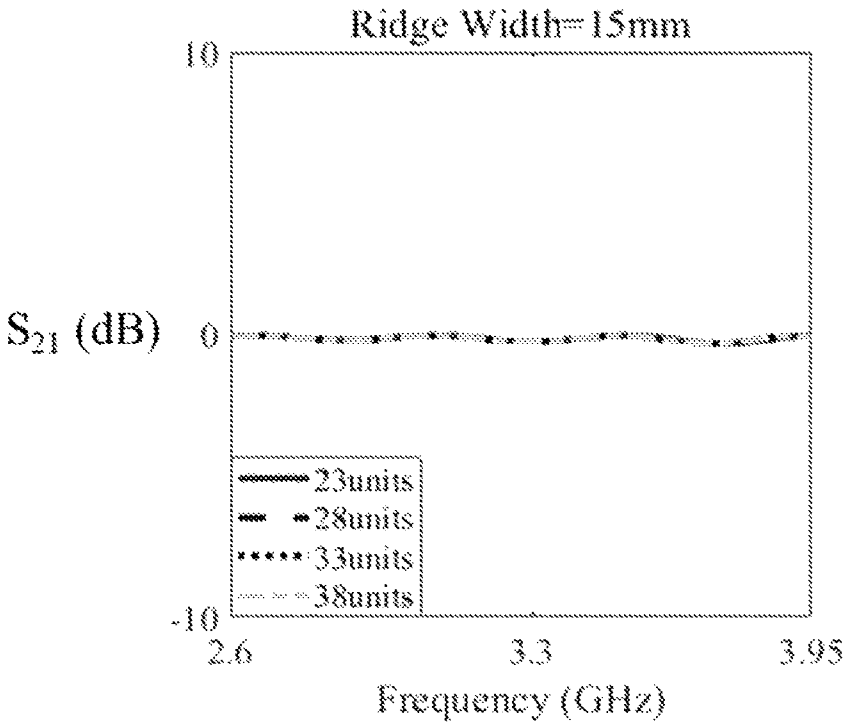
FIG. 14 is a graph showing a $S_{21}$ vs. frequency plot for bellows waveguide for different numbers of bellows units and a constant ridge width.

Example 4: Accordion Folding Pattern Waveguide-Simulation Results for Varying Number of Bellows Units while Keeping Ridge Width Constant The ridge width is set to 15 mm and the number of bellows units is varied. The transmission performance is then evaluated to understand the influence of the number of bellows units. The plots shown in FIG. 14 shows the transmission response $S_{21}$ for different number of bellows units. It was noted that the increase in transmission loss with the increase in number of bellows units was minimal. This indicated that the number of bellows units does not have a significant influence on the waveguide performance. Table 4 shows the increase in mean transmission loss of bellows models for different bellows unit number relative to the lowest bellows unit model (23 units).

TABLE 4

Increase in mean transmission loss of bellows configurations of increasing bellows unit number relative to the lowest bellows unit model (23 units)

| Number of Bellows Units | $\text{Mean}(\lvert S_{21}\rvert_{config.}) - \text{Mean}(\lvert S_{21}\rvert_{N=23\ units})$ (dB) |
|---|---|
| 28 | 0.002 |
| 33 | 0.004 |
| 38 | 0.004 |

Figure 15:
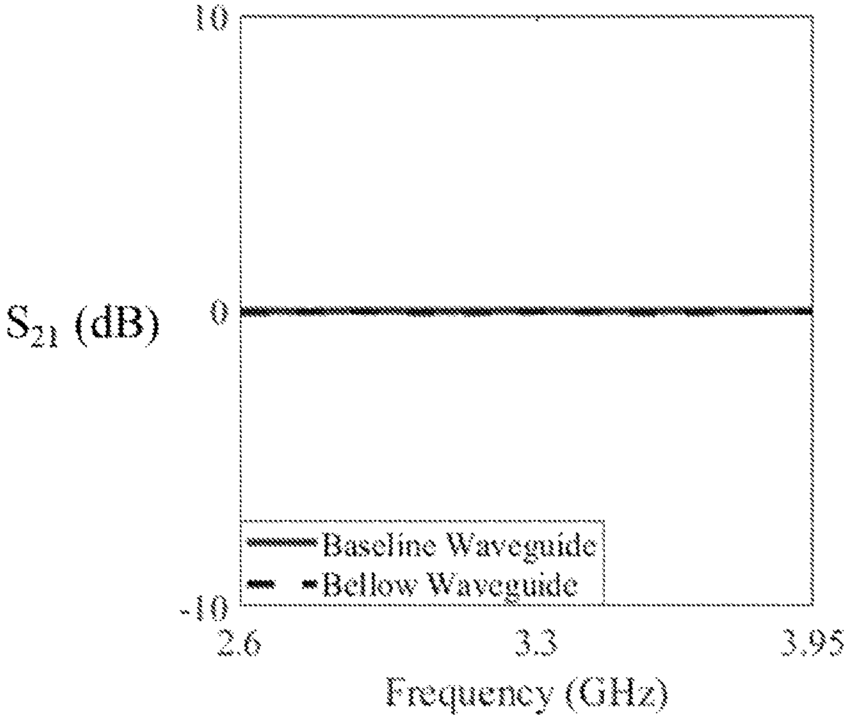
FIG. 15 is a graph showing a $S_{21}$ vs. frequency plot comparing baseline and bellows waveguide designs.

Example 5: Accordion Folding Pattern Waveguide Vs. Baseline Rectangular Waveguide Previous results indicated that the transmission loss reduces with the ridge width. Hence, the ridge width was set to 6 mm. As larger number of units would be required to build the model using lower ridge width, the number of units was set to 38. The transmission performance of the baseline rectangular waveguide and the bellows waveguide (N=38, w=6 mm) can be compared in FIG. 15. The difference between the mean value of $|S_{21}|$ computed for this bellows design and the baseline rectangular waveguide was 0.027 dB. This difference in mean transmission loss is acceptable for a wide range of applications. It can be inferred that the added advantages of designing the waveguide as a deployable structure exceeds the increased transmission loss.

Example 6: Shopping-Bag Folding Pattern Waveguide—Experimental Results

Figure 16:
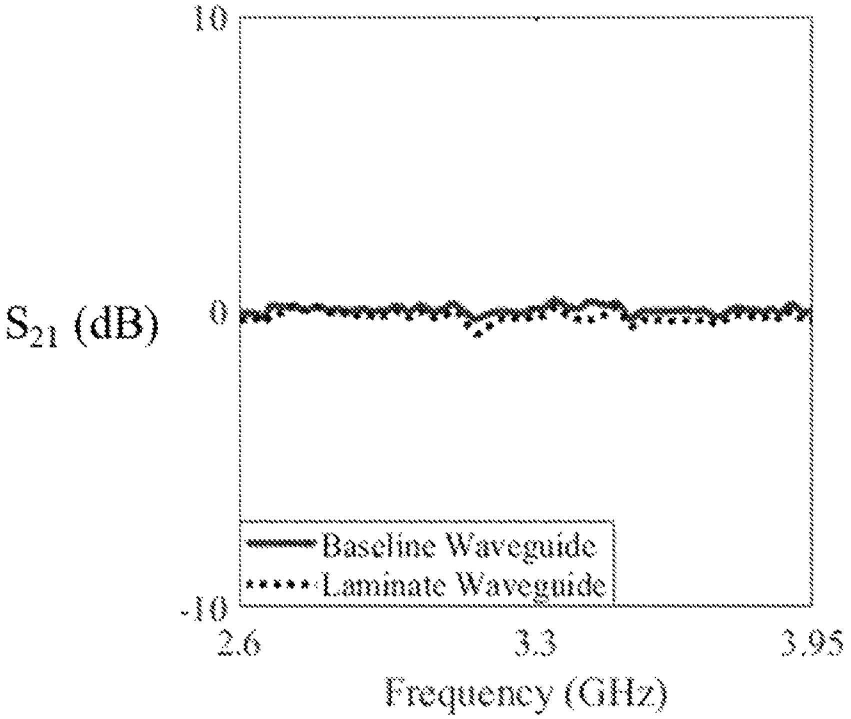
FIG. 16 is a graph showing a $S_{21}$ vs. frequency plot comparing a baseline rectangular waveguide and a laminate rectangular waveguide.

The VNA used for testing different origami waveguide designs was a Keysight N5224B PNA Microwave Network Analyzer. Short-Open-Load-Through (SOLT) calibration of the PNA was performed before the experiments were carried out. The origami models were fabricated using a paper-aluminum laminate. This laminate was made by spray gluing aluminum foil onto paper. The laminate was then creased and folded to create different models. Round flanges were then attached to the ends of these models. Initially an experiment is carried out to evaluate the transmission capabilities of paper-aluminum laminate. It is vital to ensure that the extra transmission loss owing to using the laminate to build the models is within acceptable limits. To verify this, experiments were done to compare the transmission performance of the baseline WR-284 waveguide against its replica constructed using the laminate material. This replica is a rectangular tube with dimensions same as that of the baseline waveguide with flanges attached to the ends. FIG. 16 shows the transmission performance for the baseline and its laminate replica for frequency range of 2.60 to 3.95 GHz with 1601 data points. Since the transmission response curves lie close to each other, the laminate replica has similar transmission capabilities. The difference between the mean value of $|S_{21}|$ computed for the laminate waveguide and the baseline waveguide was 0.12 dB. This difference can be attributed to the presence of numerous imperfections in the laminate. Wrinkles resulting from spray gluing were visible at numerous locations on the laminate. These wrinkles can be detrimental to transmission performance. However, this laminate can still be used to fabricate the deployable waveguides as the difference in transmission capabilities is relatively low.

Figure 17:
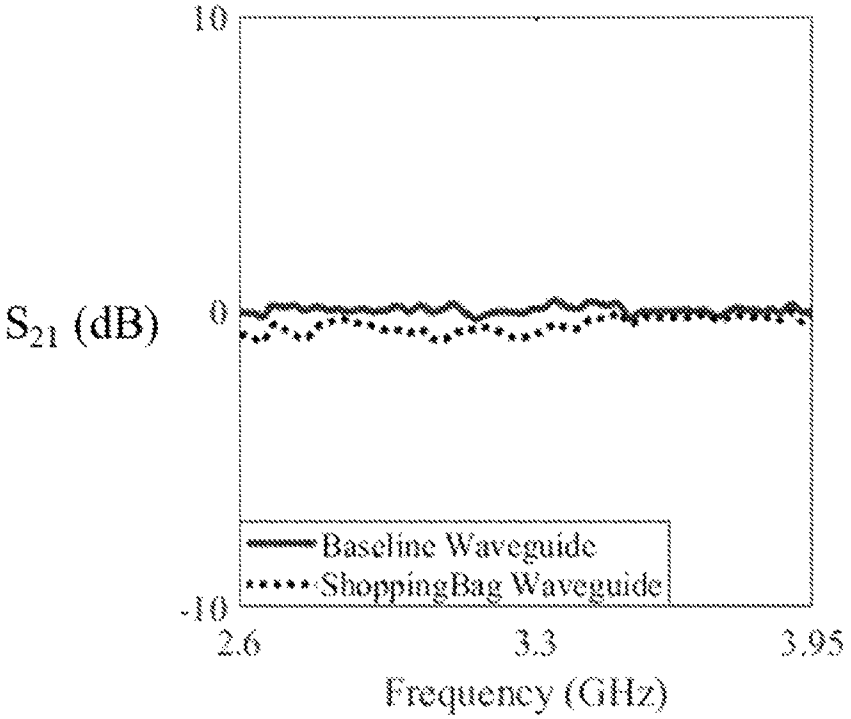
FIG. 17 is a graph showing a $S_{21}$ vs. frequency plot comparing a baseline rectangular waveguide and a shopping-bag waveguide.

Here, a convex model of the shopping bag design was fabricated for testing. $S_{21}$ vs. frequency plot for these experiments is shown in FIG. 17. From the plot it can be observed that the transmission loss is relatively higher at lower frequencies and reduces at higher frequencies. One possible reason for this trend could be linked to the convex projections on the side walls of the shopping bag waveguide. These projections could not be completely flattened out, which causes the cross-section to deviate from being precisely rectangular. These cross-sectional deviations may affect higher frequencies less, for which the wavelength is shorter, and this reflects as lower transmission loss. Overall, the shopping bag curve lies close to the standard rectangular waveguide curve. The difference between the mean value of $|S_{21}|$ computed for shopping bag waveguide and the baseline waveguide was 0.42 dB. As this difference is small, it can be concluded that the shopping bag waveguide design offers acceptable transmission capabilities.

Example 7: Accordion Folding Pattern Waveguide—Experimental Results

Figure 18:
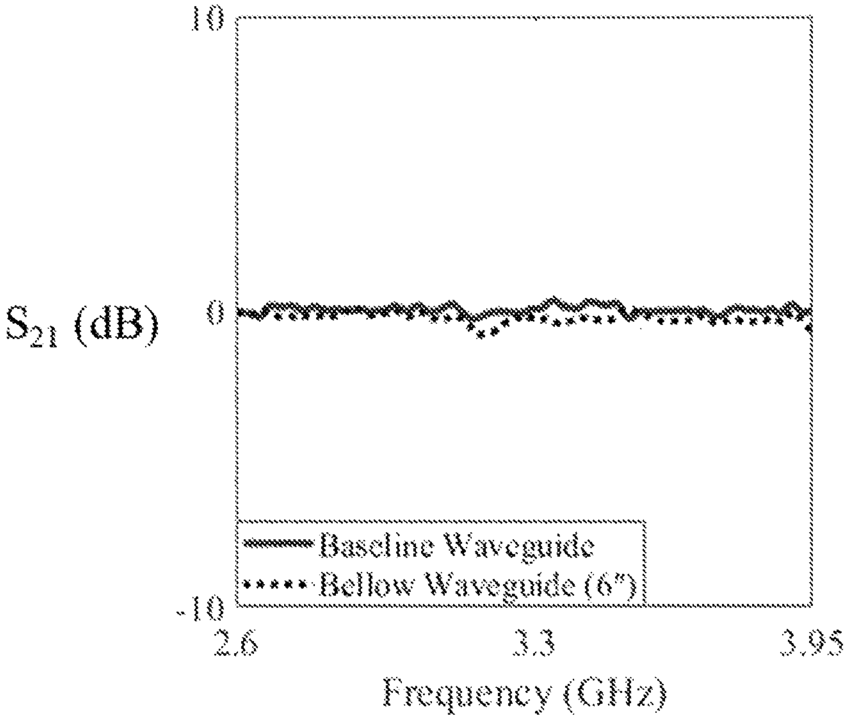
FIG. 18 is a graph showing a $S_{21}$ vs. frequency plot comparing a baseline rectangular waveguide and an origami bellows waveguide.

A bellows model that can be extended to half the length of the baseline waveguide (i.e., 6") was fabricated. The shorter length enabled easier fabrication and decreased the number of open cut regions. The ridge width for the bellows model used for testing was set to 12 mm and the number of bellows units to 5. The $S_{21}$ vs. frequency plot for the origami bellows waveguide and the baseline waveguide is depicted in FIG. 18. It can be seen that the bellows waveguide plot closely traces the baseline waveguide. The difference between the mean value of $|S_{21}|$ computed for bellows waveguide and baseline waveguide was 0.16 dB. Assuming linear increase in loss with distance, for the total length of 12" the difference is double. However, this difference is minor indicating that the origami bellows waveguide design provides acceptable transmission capabilities.

Table 5 and Table 6 summarize the difference in mean transmission loss between a deployable model and the baseline model obtained from simulations and experiments, respectively. Even though the transmission losses observed in experimental studies are higher than simulations, they still lie within acceptable limits. The difference in experiments and simulations can be attributed to several factors, including imperfections while fabricating the origami deployable structures using paper-aluminum laminate. As stated before, the difference between the mean value of $|S_{21}|$ computed for laminate waveguide and baseline waveguide was 0.12 dB. Hence, transmission losses can be substantially reduced by switching to a more robust material to fabricate the deployable waveguides. Additionally, noise during calibration and testing can accentuate the difference between simulations and experiments.

TABLE 5

| Difference in simulation mean transmission loss between a configuration and the baseline waveguide model Simulation Results | |
|---|---|
| Configuration | Mean($\|S_{21}\|_{config.}$) − Mean($\|S_{21}\|_{baseline}$) (dB) |
| Shopping Bag Convex Design | 0.094 |
| 12" Bellows (N = 38, w = 6 mm) | 0.027 |

TABLE 6

| Difference in experimental mean transmission loss between a configuration and the baseline waveguide Experimental Results | |
|---|---|
| Configuration | Mean($\|S_{21}\|_{config.}$) − Mean($\|S_{21}\|_{baseline}$) (dB) |
| Shopping Bag Convex Design | 0.42 |
| 6" Bellows (N = 5, w = 12 mm) | 0.16 |

Example 8: Accordion Folding Pattern Twisted Waveguide—Experimental Results

Figure 6:
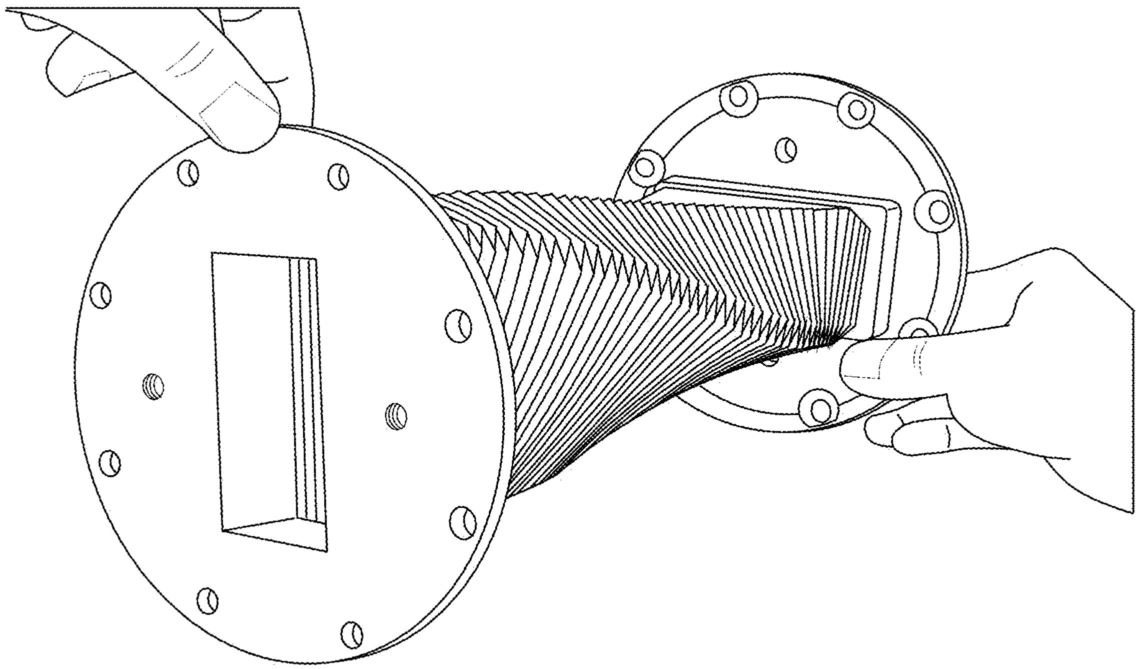
FIG. 6 shows an exemplary embodiment of a deployable twisted waveguide according to a second folding pattern.
Figure 19:
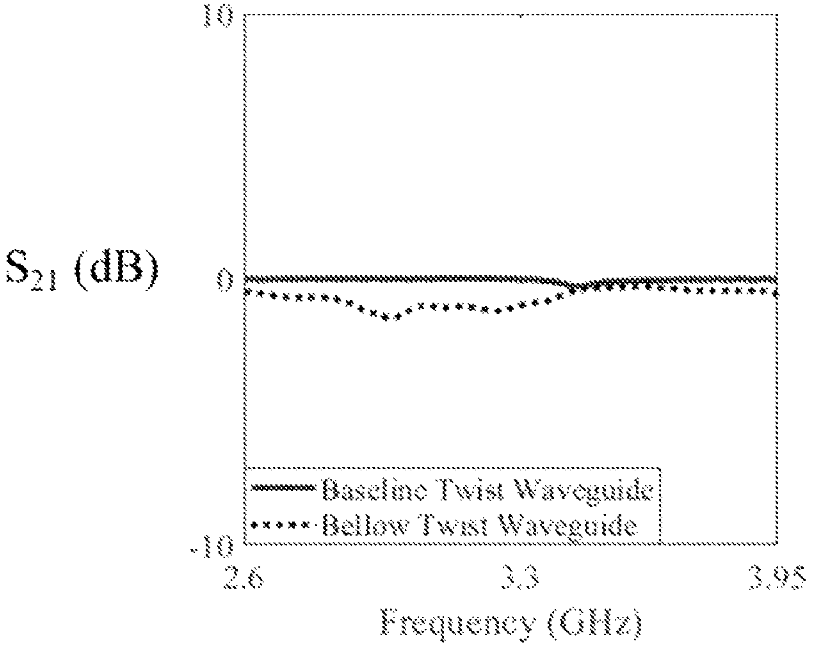
FIG. 19 is a graph showing a $S_{21}$ vs. frequency plot comparing a baseline rectangular waveguide and an origami bellows twist waveguide.

An accordion folding pattern twisted waveguide was constructed and tested, as seen in FIG. 6. The experiment was repeated 10 times, and results are shown in FIG. 19 (the curve plotted is the mean of the 10 experiments/curves). The standard deviation of the 10 means is 0.033 dB, and Mean($|S_{21}|_{origami}$)−Mean($|S_{21}|_{baseline}$)=0.698 dB.

Example 9: Accordion Folding Pattern E-Bend Waveguide—Experimental Results

Figure 7:
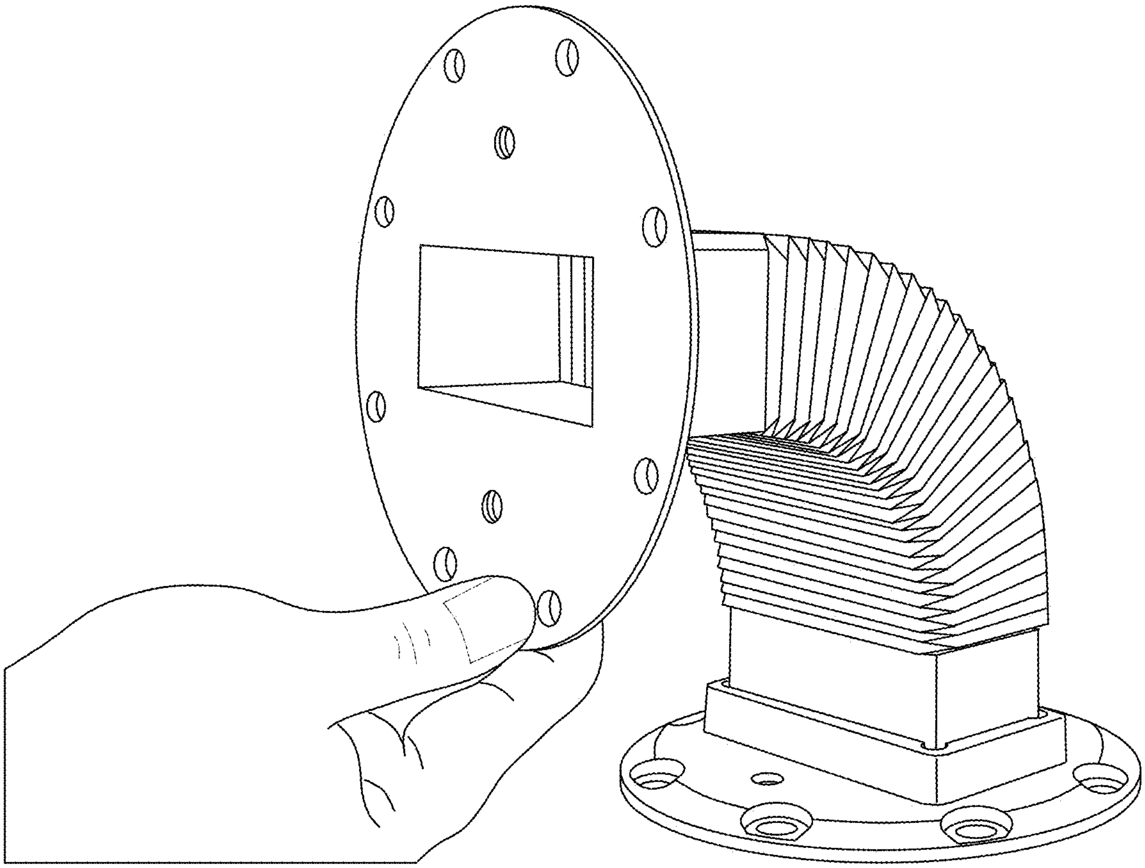
FIG. 7 shows an exemplary embodiment of a deployable E-Bend waveguide according to a second folding pattern.
Figure 20:
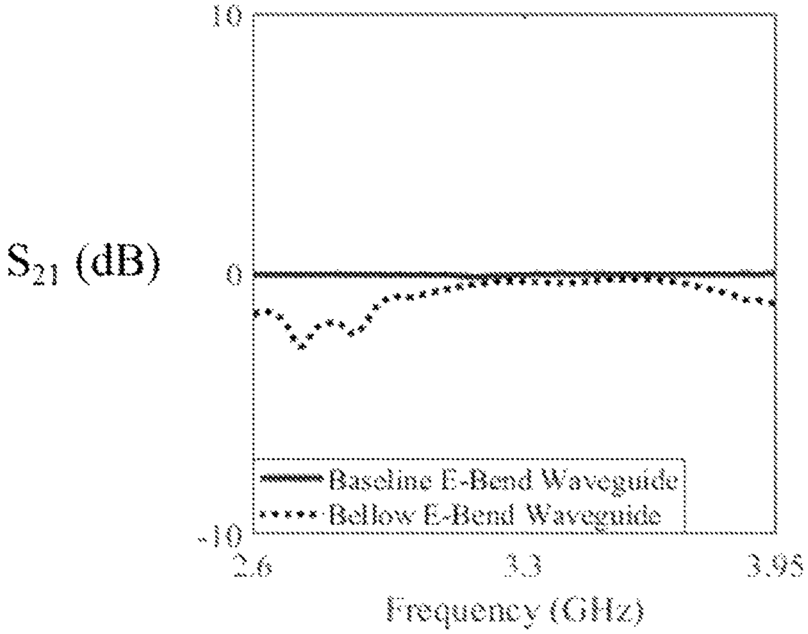
FIG. 20 is a graph showing a $S_{21}$ vs. frequency plot comparing a baseline rectangular waveguide and an origami bellows E-Bend waveguide.

An accordion folding pattern E-Bend waveguide was constructed and tested, as seen in FIG. 7. The experiment was repeated 10 times, and results are shown in FIG. 20 (the curve plotted is the mean of the 10 experiments/curves). The standard deviation of the 10 means is 0.037 dB, and Mean($|S_{21}|_{origami}$)−Mean($|S_{21}|_{baseline}$)=0.835 dB.

Example 10: Accordion Folding Pattern H-Bend Waveguide—Experimental Results

Figure 8:
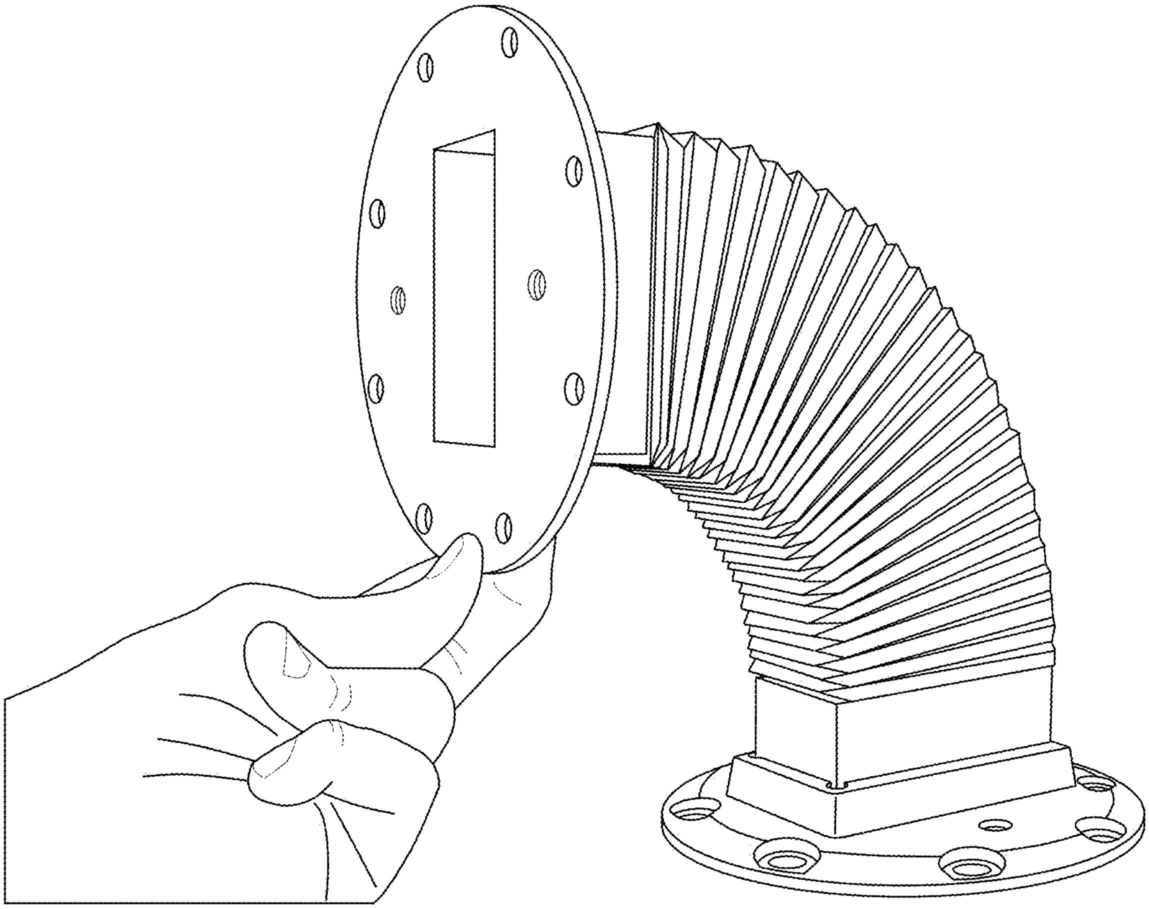
FIG. 8 shows an exemplary embodiment of a deployable H-Bend waveguide according to a second folding pattern.
Figure 21:
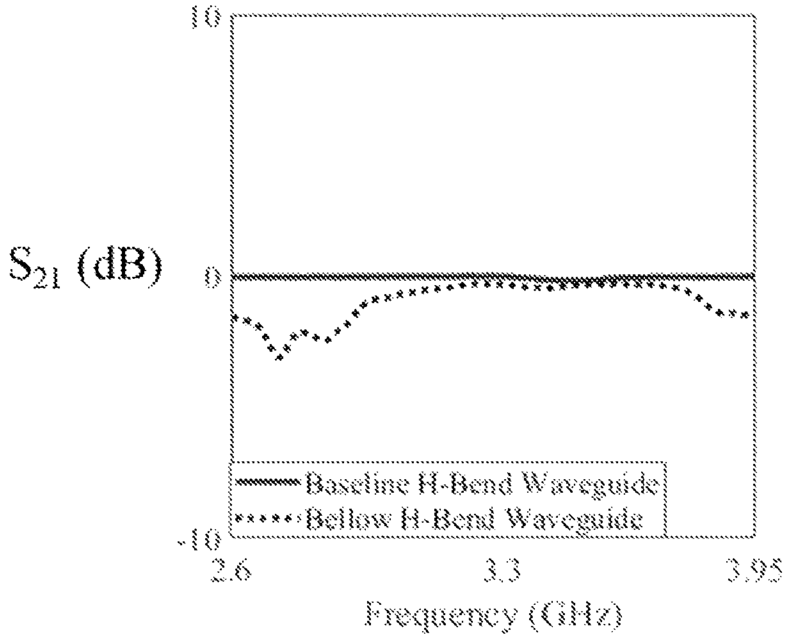
FIG. 21 is a graph showing a $S_{21}$ vs. frequency plot comparing a baseline rectangular waveguide and an origami bellows H-Bend waveguide.

An accordion folding pattern H-Bend waveguide was constructed and tested, as seen in FIG. 8. The experiment was repeated 10 times, and results are shown in FIG. 21 (the curve plotted is the mean of the 10 experiments/curves). The standard deviation of the 10 means is 0.044 dB, and Mean($|S_{21}|_{origami}$)−Mean($|S_{21}|_{baseline}$)=0.937 dB.

Example 11: Origami Waveguides Powering an LED at a Distance

Figure 22:
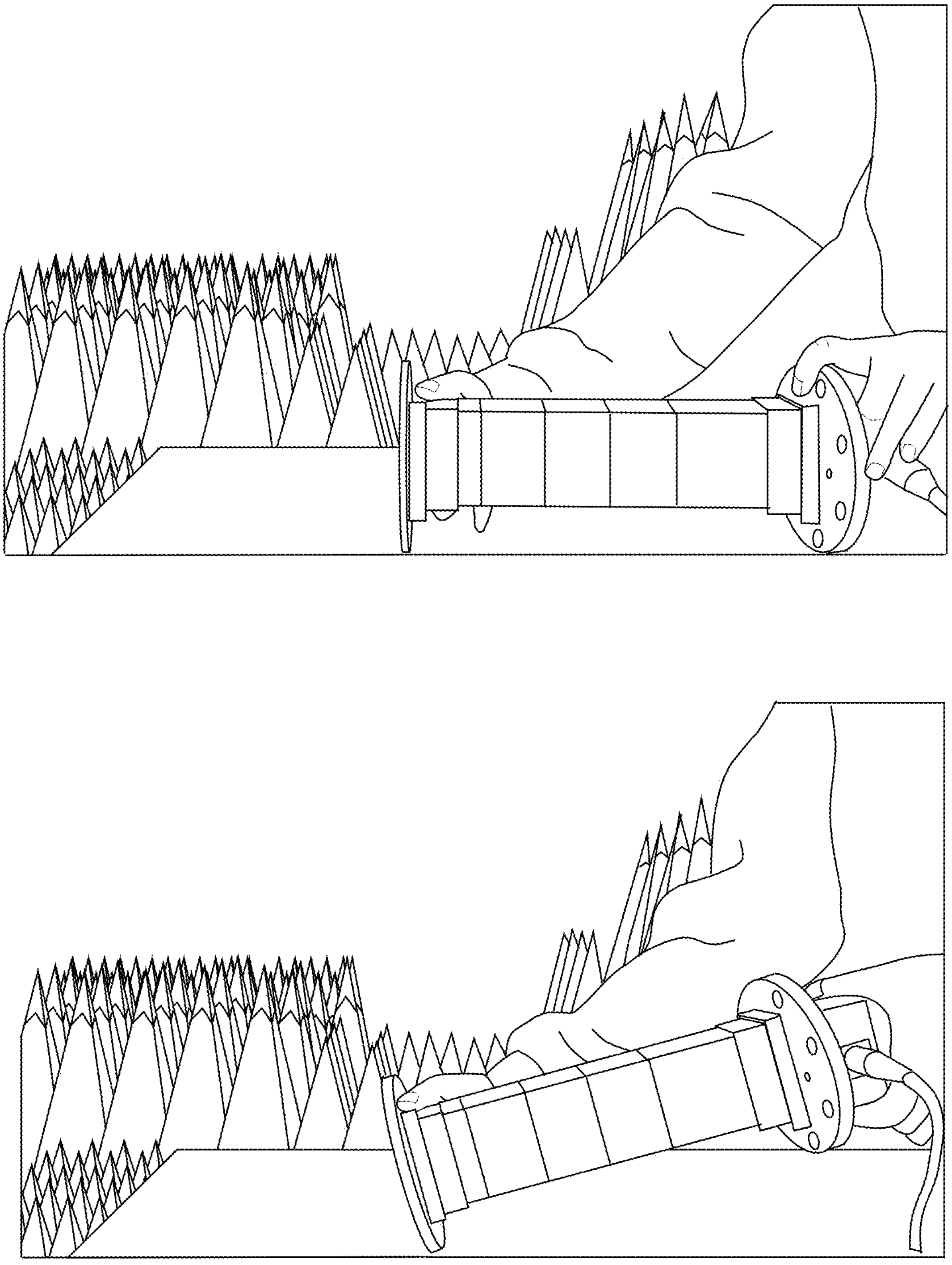
FIG. 22 is a set of images showing a fabricated embodiment of a deployable waveguide placed inside an anechoic chamber transmitting power to illuminate an LED at a shorter (top image) and longer (bottom image) distance.
Figure 23:
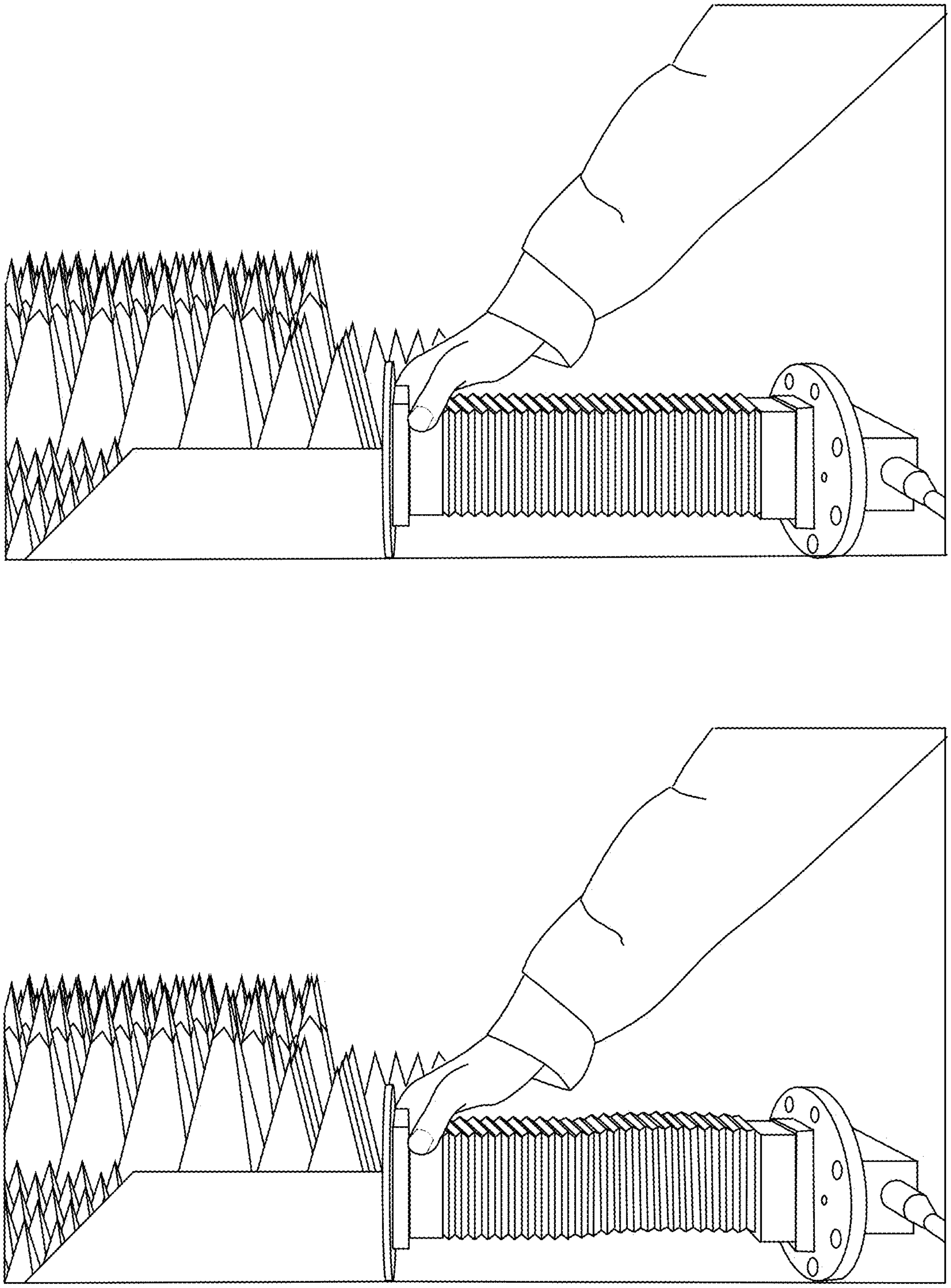
FIG. 23 is a set of images showing a fabricated embodiment of a straight bellows waveguide transmitting power to light up an LED at a shorter (top image) and longer (bottom image) distance.
Figure 24:
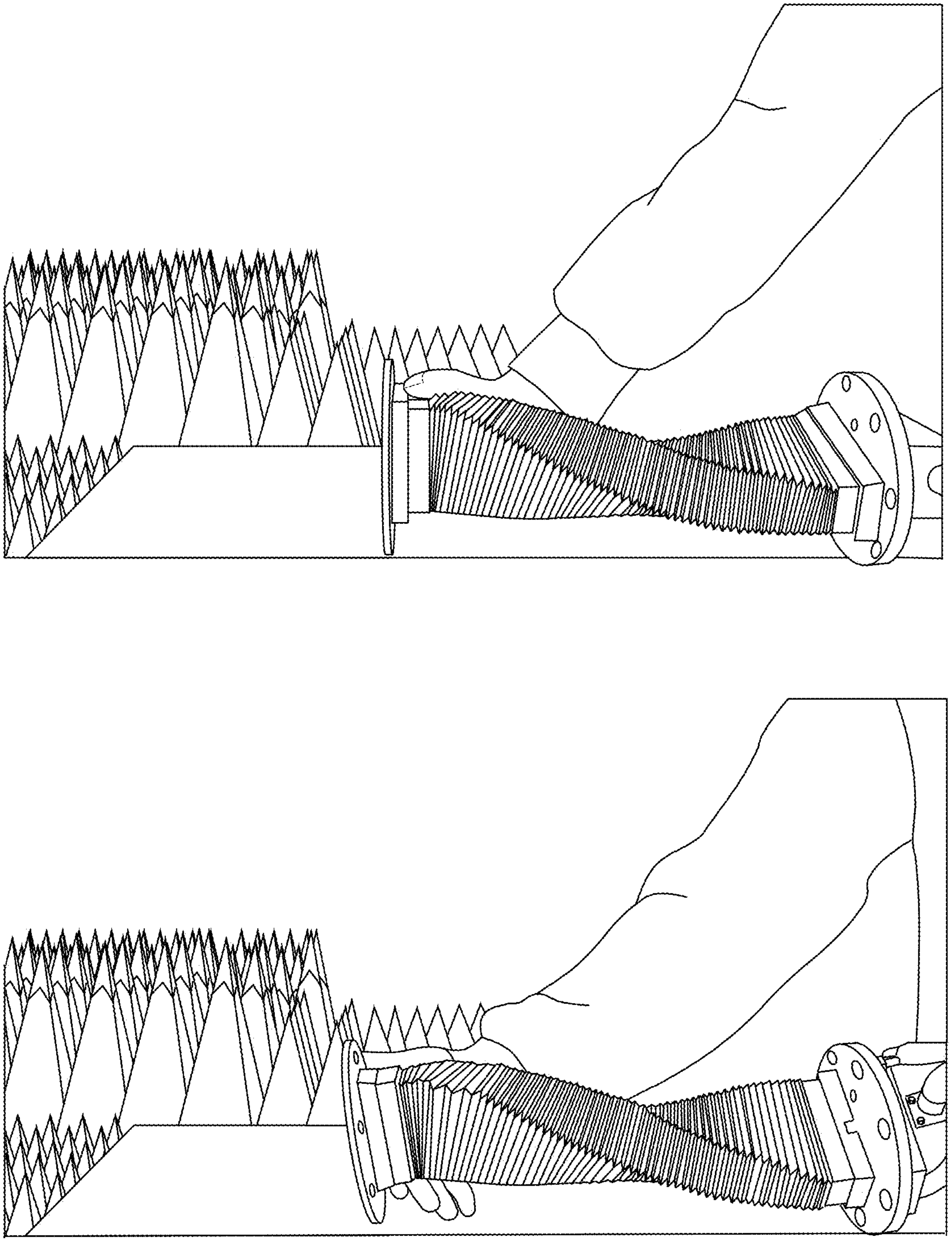
FIG. 24 is a set of images showing a fabricated embodiment of a twist bellows waveguide transmitting power to light up an LED at a shorter (top image) and longer (bottom image) distance.

FIG. 22 shows a Fabricated shopping bag waveguide placed inside an anechoic chamber transmitting power to illuminate an LED (light emitting diode) indicator (the LED had a diode placed across its terminals, with leads that acted as a dipole antenna) at a shorter (top) and longer (bottom) distance. FIG. 23 shows fabricated straight bellows waveguide transmitting power to light up an LED at a shorter (top) and longer (bottom) distance. FIG. 24 shows fabricated twist bellows waveguide placed transmitting power to light up an LED at a shorter (top) and longer (bottom) distance.

Example 12: Slotted Waveguide Antenna

The slotted waveguide antenna used for the study adopted the WR62 waveguide standard size. The WR62 waveguide has a rectangular cross-section with inner dimensions of 0.622 in (15.80 mm)×0.311 in (7.90 mm). 8 slots are placed on the top face of the rectangular tube. The length of the tube was 150 mm. The convex shopping bag design was adopted to redesign the standard rectangular slotted tube as a deployable structure. The middle triangular part of the convex shopping-bag waveguide shown in FIG. 25B is tilted by 5° with respect to the adjacent flat surface in the outward direction.

Electromagnetic simulations using COMSOL Multiphysics were employed to study the performance of the deployable slotted waveguide antenna. The CAD 3D model for the study was generated using Rhino 3D software. This model was exported as a STEP file and imported to COMSOL Multiphysics. The walls of the waveguide antenna were defined as a Perfect Electric Conductor. A sphere was used to define the Perfectly Matched Layer, and the signal input port was assigned. A physics-controlled mesh was assigned to the model. It is contemplated that while this was the method used for the present example, the study could have been completed in any number of ways.

Figure 26:
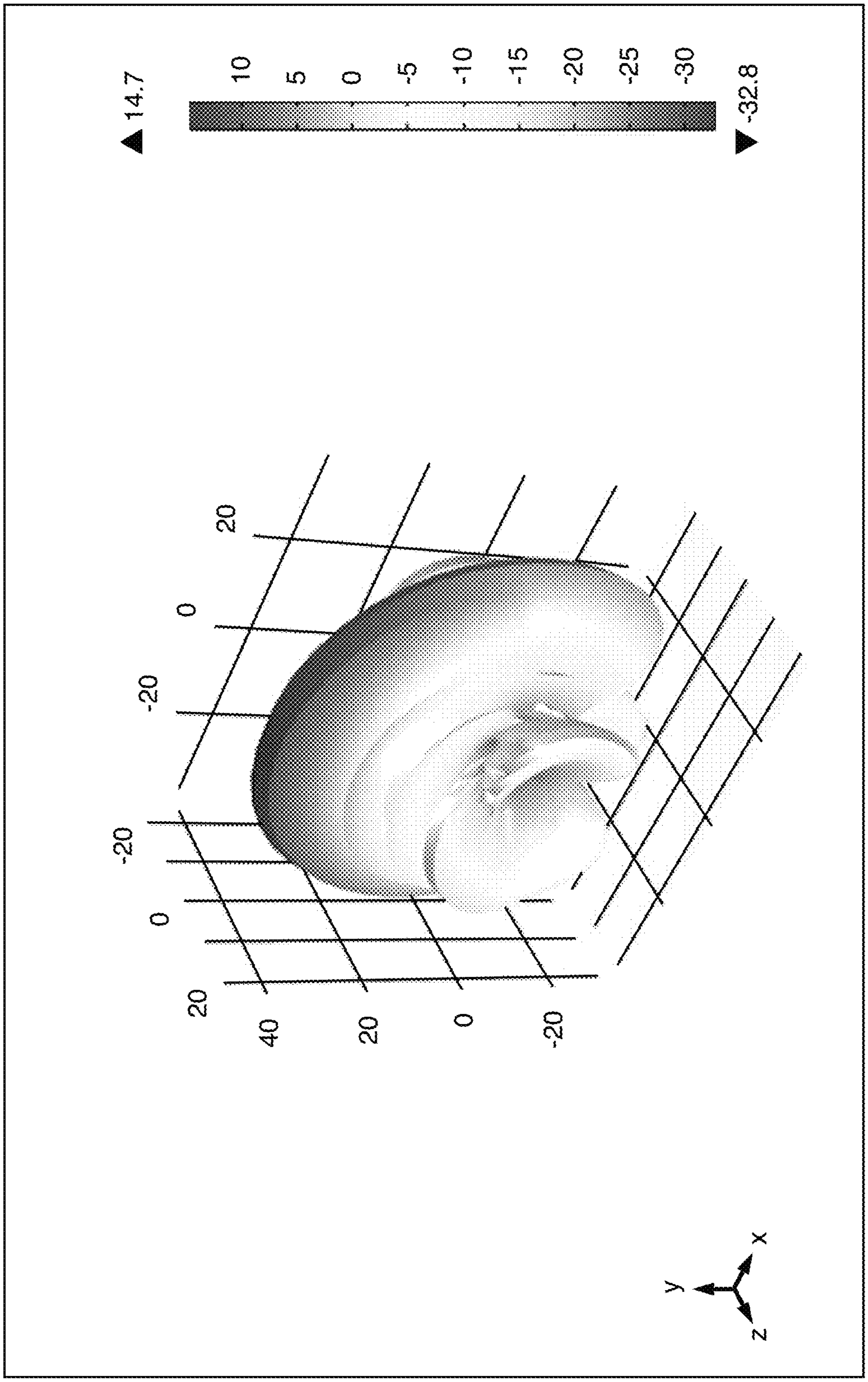
FIG. 26 illustrates the resulting far-field pattern from the standard slotted waveguide antenna.
Figure 27:
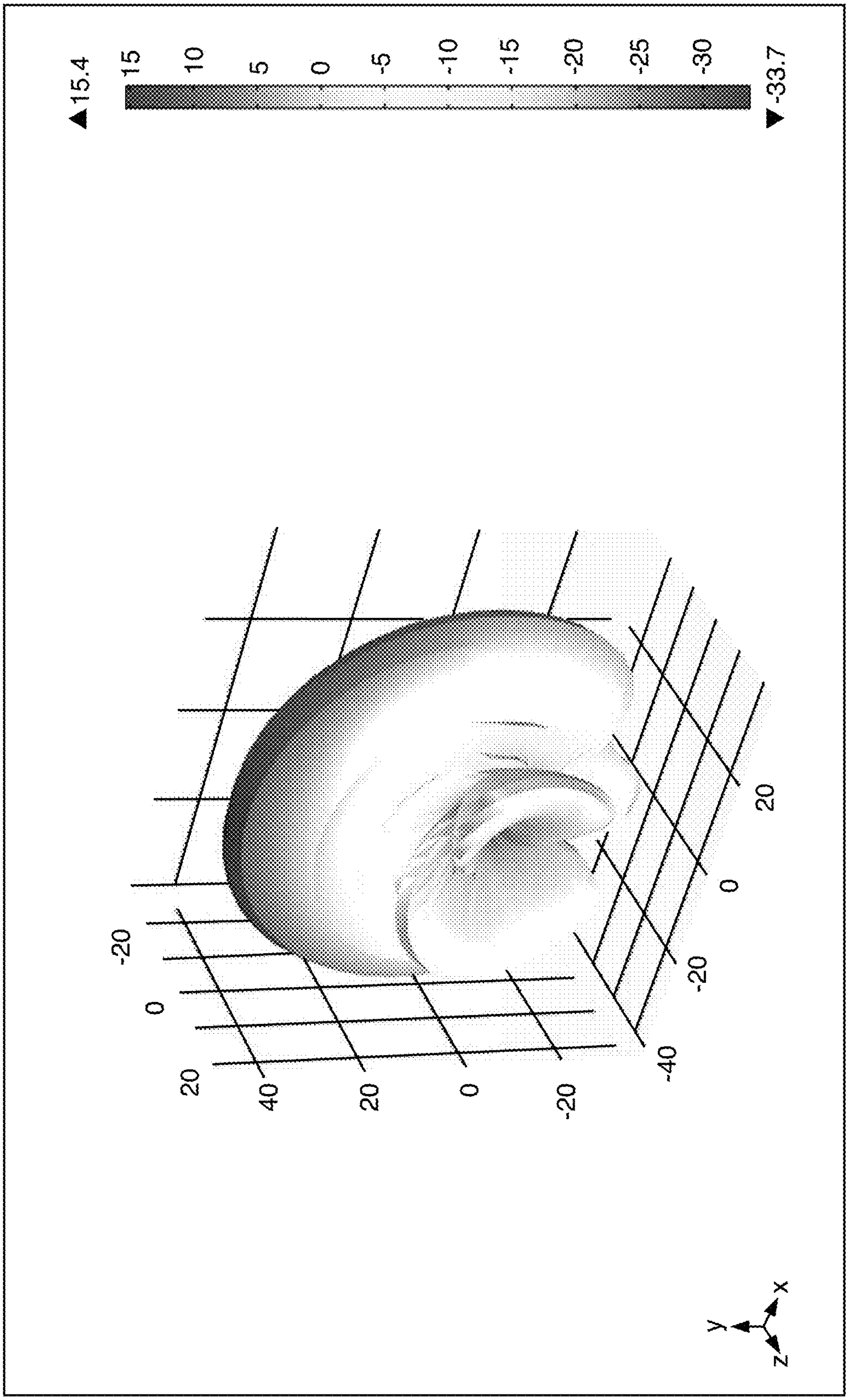
FIG. 27 shows the resulting far-field pattern from a convex shopping-bag slotted waveguide antenna embodiment.

The 3D far-field radiation pattern was employed to analyze the performance of the deployable antenna. FIG. 26 depicts the resulting far-field pattern of the standard rectangular slotted waveguide antenna. The far-field pattern of the shopping-bag waveguide antenna is shown in FIG. 27. Comparing the two shows that the shopping-bag deployable waveguide antenna obtains similar antenna performance characteristics to the conventional design.

In conclusion, simulation and experimental studies indicate that the transmission performance of these deployable waveguides meets the required criteria. As a result, conventional rectangular waveguides can be redesigned as a deployable structure using origami-inspired designs.

REFERENCES

[1] S. Pellegrino, Deployable Structures. 2001, doi: 10.1007/978-3-7091-2584-7

[2] A. E. del Grosso and P. Basso, "Deployable Structures," Embodying Intell. Struct. Integr. Syst., vol. 83, pp. 122-131, 2012, doi: 10.4028/www.scientific.net/ast.83.122.

[3] G. E. Fenci and N. G. R. Currie, "Deployable structures classification: A review," Int. J. Sp. Struct., vol. 32, no. 2, pp. 112-130, 2017, doi: 10.1177/0266351117711290.

[4] J. S. Zhao, F. Chu, and Z. J. Feng, "The mechanism theory and application of deployable structures based on SLE," Mech. Mach. Theory, vol. 44, no. 2, pp. 324-335, 2009, doi: 10.1016/j.mechmachtheory.2008.03.014.

[5] F. Jensen and S. Pellegrino, "Expandable structures formed by hinged plates," Sp. Struct. 5, no. January 2002, pp. 1:263-272, 2002, doi: 10.1680/ss5v1.31739.0028.

[6] Y. Liu, H. Du, L. Liu, and J. Leng, "Shape memory polymers and their composites in aerospace applications: A review," Smart Mater. Struct., vol. 23, no. 2, 2014, doi: 10.1088/0964-1726/23/2/023001.

[7] L. Puig, A. Barton, and N. Rando, "A review on large deployable structures for astrophysics missions," Acta Astronaut., vol. 67, no. 1-2, pp. 12-26, 2010, doi: 10.1016/j.actaastro.2010.02.021.

[8] V. Peypoudat et al., "Development of A 3.2M-long inflatable and rigidizable solar array breadboard," Collect. Tech. Pap.—AIAA/ASME/ASCE/AHS/ASC Struct. Struct. Dyn. Mater. Conf., vol. 2, no. April, pp. 928-935, 2005, doi: 10.2514/6.2005-1881.

[9] D. P. Cadogan and S. E. Scarborough, "Rigidizable materials for use in gossamer space inflatable structures," 19th AIAA Appl. Aerodyn. Conf., no. c, 2001, doi: 10.2514/6.2001-1417.

[10] M. Humphries, A. Haslehurst, and D. Forster, "The design and development of a multi element telescopic Boom (known as the Sula Boom)," Eur. Sp. Agency, (Special Publ. ESA SP, vol. 2007, no. SP-653, pp. 19-21, 2007.

[11] J. K. H. Lin, C. F. Knoll, and C. E. Willey, "Shape memory Rigidizable Inflatable (RI) structures for large space systems applications," Collect. Tech. Pap.—AIAA/ASME/ASCE/AHS/ASC Struct. Struct. Dyn. Mater. Conf., vol. 5, no. May, pp. 3695-3704, 2006, doi: 10.2514/6.2006-1896.

[12] J. Huang, H. Fang, B. Lopez, and M. Lou, "The development of inflatable array antennas," AIAA Sp. 2003 Conf. Expo., vol. 43, no. 4, 2003, doi: 10.1109/AERO.2000.878472.

[13] G. Kiper and E. Söylemez, "Deployable space structures," RAST 2009-Proc. 4th Int. Conf. Recent Adv. Sp. Technol., pp. 131-138, 2009, doi: 10.1109/RAST.2009.5158183.

[14] T. Hamil, R. L. Bunker, S. G. Bailey, H. B. Curtis, and E. Gaddy, "Solar Cell and Array Technology for Future Space Missions," NASA Tech. note, 2001, [Online]. Available: https://solarsystem.nasa.gov/docs/D-24454 (2)—Solar Cell and Array Technology 20022.pdf.

[15] W. M. Sokolowski and S. C. Tan, "Advanced self-deployable structures for space applications," J. Spacecr. Rockets, vol. 44, no. 4, pp. 750-754, 2007, doi: 10.2514/1.22854.

[16] P. Gruber, S. Häuplik, B. Imhof, K. Özdemir, R. Waclavicek, and M. A. Perino, "Deployable structures for a human lunar base," Acta Astronaut., vol. 61, no. 1-6, pp. 484-495, 2007, doi: 10.1016/j.actaastro.2007.01.055.

[17] B. Imhof, J. Nelson, H. K. Madakashira, A. Aabloo, P. Weiss, and D. Ševčík, "SHEE—a Self-deployable Habitat for Extreme Environments Exploitation and lessons learnt from testing," 46th Int. Conf. Environ. Syst. 2, no. July 2016.

[18] M. Kilian, C. Hartwanger, M. Schneider, and M. Hatzenbichler, "Waveguide components for space applications manufactured by additive manufacturing technology," IET Microwaves, Antennas Propag., vol. 11, no. 14, pp. 1949-1954, 2017, doi: 10.1049/iet-map.2016.0984.

[19] N. Carolina, J. Butler, N. Pehrson, T. Bateman, J. Morgan, and L. L. Howell, "Highly Compressible Origami Bellows For Harsh Environments," pp. 1-11, 2016, https://doi.org/10.1115/DETC2016-59060.

[20] J. Butler, S. Magleby, L. Howell, S. Mancini, and A. Parness, "Highly compressible origami bellows for microgravity drilling-debris containment," AIAA Sp. Astronaut. Forum Expo. Sp. 2017, no. 203999, pp. 1-16, 2017, doi: 10.2514/6.2017-5341.

[21] Mauro, G. S., Torrisi, G., Leonardi, O., Pidatella, A., Sorbello, G. and Mascali, D., 2021 February. Design and Analysis of Slotted Waveguide Antenna Radiating in a "Plasma-Shaped" Cavity of an ECR Ion Source. In Telecom (Vol. 2, No. 1, pp. 42-51). MDPI.

It should be understood that modifications to the embodiments disclosed herein can be made to meet a particular set of design criteria. For instance, the number of or configuration of components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of the device and methods of making and using the same have been discussed and illustrated herein, it is to be distinctly understood that the invention is not limited thereto but may be otherwise variously embodied and practiced within the scope of the following claims.

What is claimed is:

1. A deployable waveguide, comprising:

a hollow tube extending in a longitudinal direction and comprising a first side wall, a second side wall, a top wall, and a bottom wall, wherein the hollow tube is folded according to an origami-inspired folding pattern, wherein the hollow tube is folded according to the folding pattern such that:

the first side wall has a plurality of first cross-sectional creases, the second side wall has a plurality of second cross-sectional creases opposite of the first cross-sectional creases of the first side wall, the top wall has a first longitudinal crease, and the bottom wall has a second longitudinal crease opposite of the first longitudinal crease of the top wall.

2. The deployable waveguide of claim 1, wherein the waveguide is reconfigurable to various states of length along the longitudinal direction.

3. The deployable waveguide of claim 2, wherein the waveguide is reconfigurable between a compressed state of length and an expanded state of length.

4. The deployable waveguide of claim 3, wherein a cross-sectional profile at a first end of the waveguide is smaller than a cross-section profile at a second end of the waveguide such that the waveguide expands in a transverse direction when in the expanded state of length.

5. The deployable waveguide of claim 1, wherein the hollow tube comprises an exterior surface and an interior surface, wherein the interior surface comprises a conductive material.

6. The deployable waveguide of claim 1, wherein the plurality of first cross-sectional creases includes first concave creases and first convex creases following an alternating pattern, and wherein the plurality of second cross-sectional creases includes second concave creases and second convex creases following an alternating pattern.

7. The deployable waveguide of claim 6, wherein each first concave crease is opposite of each second convex crease, and wherein each first convex crease is opposite of each second concave crease.

8. The deployable waveguide of claim 1, wherein the first longitudinal crease and second longitudinal creases are concave creases.

9. The deployable waveguide of claim 1, wherein the first longitudinal crease and second longitudinal creases are convex creases.

10. The deployable waveguide of claim 1, wherein the waveguide is selected from the group consisting of a straight waveguide, a twisted waveguide, and E-Bend waveguide, an H-Bend waveguide, and a magic tee waveguide.

11. The deployable waveguide of claim 1, wherein the waveguide is a slotted waveguide antenna comprising at least one slot.

12. The deployable waveguide of claim 11, wherein the at least one slot is positioned in a predetermined arrangement such that the waveguide achieves a desired radiation pattern when the waveguide is in an expanded state of length.

13. The deployable waveguide of claim 1, wherein the waveguide is a directional coupler.

14. The deployable waveguide of claim 1, wherein the waveguide is a waveguide transition.

15. The deployable waveguide of claim 1, wherein the waveguide is a filter selected from the group consisting of a band-pass filter, a band-stop filter, a high-pass filter, and a low-pass filter.

16. The deployable waveguide of claim 1, wherein the waveguide is a splitter configured to split microwave power.

17. The deployable waveguide of claim 1, wherein the waveguide is a combiner configured to combine microwave power.

18. The deployable waveguide of claim 1, wherein the waveguide is an attenuator configured to reduce microwave power.

19. The deployable waveguide of claim 1, wherein the waveguide is a resonant cavity.

20. A deployable waveguide assembly, comprising:

the deployable waveguide of claim 1;

a first flange connected to a first end of the hollow tube; and a second flange connected to a second end of the hollow tube.

* * * * *